United States Patent
Kim et al.

(10) Patent No.: US 10,809,791 B2
(45) Date of Patent: Oct. 20, 2020

(54) METHOD FOR DISPLAYING CONTENT AND ELECTRONIC DEVICE THEREOF

(71) Applicant: Samsung Electronics Co., Ltd., Gyeonggi-do (KR)

(72) Inventors: Na-Young Kim, Gyeonggi-do (KR); Harim Kim, Gyeonggi-do (KR); Jong-Kon Bae, Seoul (KR); Na-Kyoung Lee, Gyeonggi-do (KR); Min-Sung Lee, Gyeonggi-do (KR); Hyun Soo Kim, Gyeonggi-do (KR); Dong-Hyun Yeom, Gyeonggi-do (KR); Chang-Ryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 260 days.

(21) Appl. No.: 15/869,603

(22) Filed: Jan. 12, 2018

(65) Prior Publication Data
US 2018/0203500 A1 Jul. 19, 2018

(30) Foreign Application Priority Data
Jan. 13, 2017 (KR) .......................... 10-2017-0006080

(51) Int. Cl.
*G06F 1/32* (2019.01)
*G06F 1/3287* (2019.01)
(Continued)

(52) U.S. Cl.
CPC .............. *G06F 1/3287* (2013.01); *G06F 1/28* (2013.01); *G06F 1/3212* (2013.01);
(Continued)

(58) Field of Classification Search
CPC ..... G06F 1/3243; G06F 1/3212; G06F 1/3287
See application file for complete search history.

(56) References Cited

U.S. PATENT DOCUMENTS 7,295,178 B2  11/2007  Nakano et al.
8,024,814 B2   9/2011  Ishii
(Continued)

FOREIGN PATENT DOCUMENTS

JP       2004-045748 A    2/2004
KR  10-2016-0076454 A    6/2016
(Continued)

OTHER PUBLICATIONS

European Search Report dated Jun. 15, 2018.
European Search Report dated Nov. 8, 2019.

*Primary Examiner* — Albert Wang
(74) *Attorney, Agent, or Firm* — Cha & Reiter, LLC.

(57) ABSTRACT

Various exemplary embodiments of the present disclosure relate to an apparatus and method for outputting content in an electronic device. In this case, the electronic device includes a display module, a power module configured to interrupt power supply to at least one element of the electronic device based on a control signal, and a processor. The processor may be configured to transmit to the power module the control signal for interrupting the power supply to the processor if a designated condition is satisfied, and transmit content information to the display module so that the display module displays the content information when the power supply to the processor is interrupted.

17 Claims, 22 Drawing Sheets

(51) Int. Cl.
*G06F 1/28* (2006.01)
*G09G 5/12* (2006.01)
*G06F 1/3234* (2019.01)
*G06F 1/3212* (2019.01)

(52) U.S. Cl.
CPC ............ *G06F 1/3262* (2013.01); *G09G 5/12* (2013.01); *G09G 2330/021* (2013.01); *G09G 2330/027* (2013.01); *G09G 2354/00* (2013.01); *Y02D 10/171* (2018.01); *Y02D 10/174* (2018.01)

(56) References Cited

U.S. PATENT DOCUMENTS

| | | |
|---|---|---|
| 8,933,915 B2 | 1/2015 | Peng et al. |
| 2001/0043203 A1 | 11/2001 | Iinuma |
| 2013/0033510 A1* | 2/2013 | Dou ................. G06F 3/1415 345/531 |
| 2013/0138989 A1 | 5/2013 | Jang et al. |
| 2014/0285498 A1 | 9/2014 | Kim et al. |
| 2014/0333608 A1 | 11/2014 | Okairi et al. |
| 2016/0267883 A1* | 9/2016 | Bibikar ................. G09G 5/36 |
| 2016/0275480 A1 | 9/2016 | Sanaboyina et al. |

FOREIGN PATENT DOCUMENTS

| | | |
|---|---|---|
| KR | 10-1658440 B1 | 9/2016 |
| KR | 10-2017-0008698 A | 1/2017 |

\* cited by examiner

METHOD FOR DISPLAYING CONTENT AND ELECTRONIC DEVICE THEREOF

CLAIM OF PRIORITY

This application claims the benefit under 35 U.S.C. § 119(a) of a Korean patent application filed in the Korean Intellectual Property Office on Jan. 13, 2017 and assigned Serial No. 10-2017-0006080, the entire disclosure of which is hereby incorporated by reference.

BACKGROUND

1. Field of the Present Disclosure

Various exemplary embodiments of the present disclosure generally relate to apparatuses and methods for displaying content when driving of a processor is limited.

2. Description of the Related Art

With advancements in information communication techniques and semiconductor techniques, electronic devices for providing various multimedia services have been developed. Multimedia service may include voice call service, message service, broadcasting service, wireless Internet service, image/video capture service, music playback service, etc.

These electronic devices may provide their users with a variety of content (e.g., images, video, etc.) via their displays. The display may include a display panel for displaying the content and a Display Driver Integrated circuit (DDI) for driving the display panel.

SUMMARY

In one embodiment, an electronic device may control a display panel to display content data (e.g., image data) provided from a processor (e.g., an application processor) via a display driver circuit. For example, the processor of the electronic device may generate content data for the entirety of the display panel in frames. The display driver circuit may control the display panel to display the content data generated by the processor.

The electronic device may have different power requirements for different internal modules or for different tasks. For example, if processing by the processor is limited (e.g., the processor is powered off), the electronic device may have limitations for not only the DDI but also for display tasks because, due to the processor being limited, there may be little or none generated content data to be displayed. Accordingly, the electronic device requires a method for providing information required by the user when processing by the processor is limited (e.g. when the electronic device is in a power saving state).

Various exemplary embodiments of the present disclosure may provide apparatuses and methods for outputting content data via a display control module when the processing by the processor is limited (e.g., the processor is powered off). Additionally, embodiments of the present disclosure may automatically determine the reference voltage level for triggering the processing-limited state. The automatic determination may be based on the size and output duration of the content to be displayed during the processing-limited state.

According to various exemplary embodiments of the present disclosure, an electronic device may include a display module, a power module configured to interrupt power supply to at least one element of the electronic device based on a control signal, and a processor. The processor may be configured to transmit to the power module the control signal for interrupting the power supply to the processor if a designated condition is satisfied, and transmit content information to the display module so that the display module displays the content information when the power supply to the processor is interrupted.

According to various exemplary embodiments of the present disclosure, a method of operating an electronic device may include, if a designated condition is satisfied, transmitting a control signal for interrupting power supply to a processor of the electronic device to a power module, wherein the power module is configured to interrupt the power supply to at least one element of the electronic device based on the control signal, and transmitting content information to a display module of the electronic device so that the display module displays the content information when the power supply to the processor is interrupted.

According to various exemplary embodiments of the present disclosure, an electronic device may include a display module, a processor, and a power module for controlling power supply of the electronic device. The power module may be configured to cut off the power supply to the processor while maintaining the power supply to the display module based on a power control signal acquired from the processor. The display module may be configured to output at least one part of content to at least one area of the display module when the power supply to the processor is cut off.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
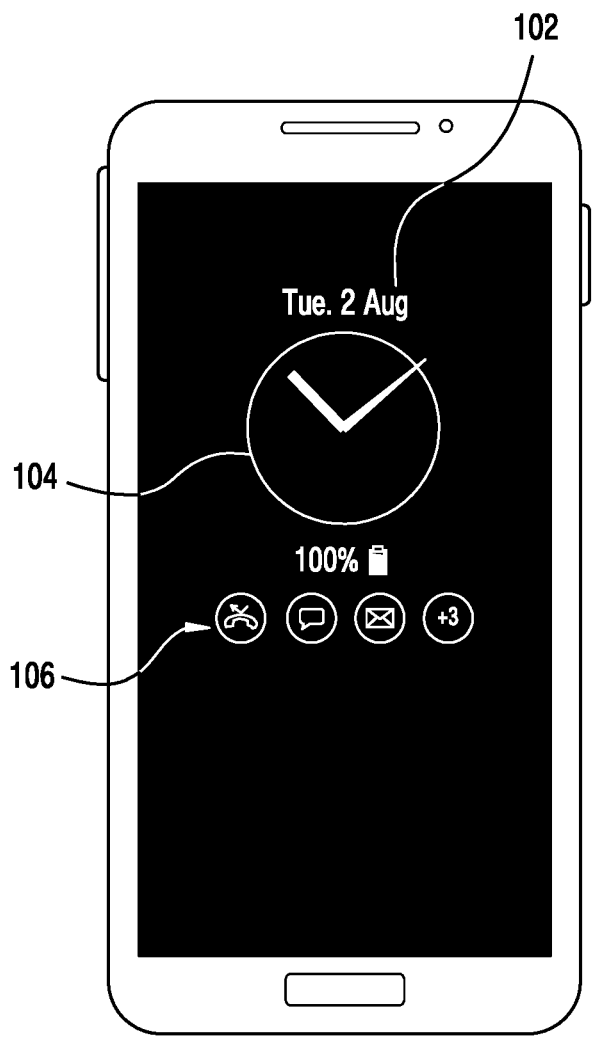
FIG. 1A, FIG. 1B, FIG. 1C, FIG. 1D and FIG. 1E are views illustrating an electronic device according to various exemplary embodiments of the present disclosure.

Hereinafter, various exemplary embodiments of the present disclosure are described with reference to the accompanying drawings. It should be understood, however, that the disclosure not intended to limit the various exemplary embodiments to the particular form disclosed, but, on the contrary, is intended to cover all modifications, equivalents, and alternatives falling within the spirit and scope of the present disclosure. Like reference numerals denote like components throughout the drawings. The terms in singular form may also refer to the plural, unless otherwise specified.

In the disclosure disclosed herein, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included. The terms, such as "first," "second," and the like used herein may refer to various elements of various embodiments, but do not limit the elements. Furthermore, such terms may be used to distinguish one element from another element. For example, "a first user device" and "a second user device" may indicate different user devices regardless of the order or priority thereof. In another example, "a first user device" and "a second user device" indicate different user devices. It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., the third element).

The expression "configured to" used herein may mean "suitable for," "having the capacity to," "designed to," "adapted to," "made to," or "capable of." As such, the term "configured to" does not necessarily mean only "specifically designed to" in hardware. Instead, the expression "a device configured to" may mean that the device is "capable of" operating together with another device or other components. A "processor configured to perform A, B, and C," for example, may mean a dedicated processor (e.g., an embedded processor) for performing the specified operation or a generic-purpose processor (e.g., a central processing unit (CPU) or an application processor) which may perform the specified operation by executing one or more software programs which are stored in a memory device.

Electronic devices according to various embodiments of the present disclosure may be smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, and wearable devices. Herein, the wearable includes at least one of head-mounted-devices (HMDs), electronic glasses, electronic apparel, electronic bracelets, electronic necklaces, electronic tattoos, smart watches, and the like.

According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like).

According to another embodiment, the electronic devices may be parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described devices or a combination thereof. An electronic device according to an embodiment may be a flexible device. Furthermore, an electronic device according to an embodiment may not be limited to the above-described electronic devices and may include other electronic devices developed in the art.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A to FIG. 1E are views illustrating an electronic device according to various exemplary embodiments of the present disclosure.

According to one exemplary embodiment, when a processor is driven, the electronic device may operate under a wake-up mode and a power saving mode. For example, when operating in the wake-up mode, the electronic device may supply sufficient power to hardware modules and/or software modules included in the electronic device to provide various functions the electronic device is capable of. When operating in the power saving mode, the electronic device may perform limited functions and deactivate certain of the hardware modules and/or software modules included in the electronic device. For example, the power saving mode may include a sleep mode.

When operating in the power saving mode, the electronic device may, using the display control module, display certain information on the display panel and update the information over time. For example, the processor may store driving information and content data to be displayed in the power saving mode in a memory of the display control module before transitioning to the power saving mode. During the power saving mode, the display control module may still be active, and it may provide control to output the content data stored in the memory area. For example, during the power saving mode, the electronic device may output the content information to a designated area of the display panel as shown in FIG. 1A to FIG. 1E. The content data may be icons, images, time information, dates, other user-designated text, etc. The driving information may indicate various requirements for displaying the content data, such as update period (the time interval at which the content data is updated), content display size, and display area information (the location of the designated area in the display panel).

Figure 1B:
Figure 1C:
Figure 1D:
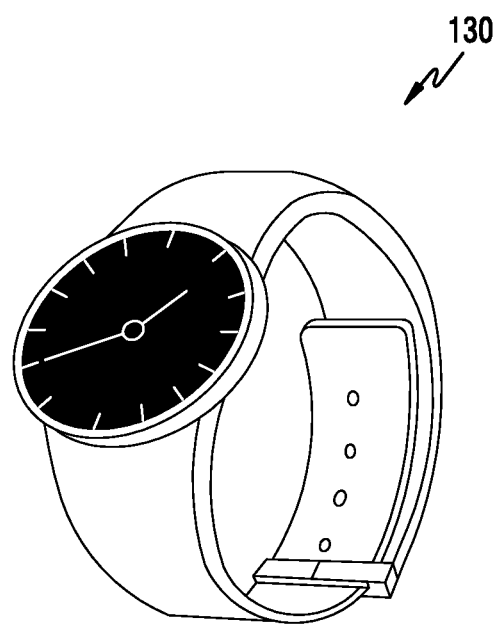
Figure 1E:

According to one exemplary embodiment, the electronic device may limit (e.g., power off) the driving of the processor when battery voltage of the electronic device is lower than or equal to a reference level. For example, the electronic device may interrupt the power supply of the processor. In this case, the electronic device may maintain power supply for the display control module, and thus, as shown in FIG. 1A to FIG. 1E, may display information on the display panel and update the information under the control of the display control module. For example, as shown in FIG. 1A, the electronic device may output content information including date 102, an analog clock 104 indicating the current time, and notification information 106 to a designated area of the display panel. In another example, as shown in FIG. 1B, the electronic device may display the current time in a form of a digital clock 112. In another example, as shown in FIG. 1C, the electronic device may display dates in the form of a calendar 122. In another example, when the electronic device is a wearable device, as shown in FIG. 1D, the electronic device may output an analog clock 130 indicating the current time. In another example of a wearable device, as shown in FIG. 1E, the electronic device may output a digital clock 142 indicating the current time and icons 144 for executing various function.

When content information is output during the power saving mode (e.g. the processor is powered off), the electronic device may set a color of a pixel used to display content to an overall color that can be supported in the display panel, or limit the available colors for display. For example, when displaying content during the power saving mode, the pixels that are not used for the content may be set to a predetermined color (e.g., black). If the display panel is an OLED panel, the electronic device may deactivate the pixels that are not used.

When the content information is output during the power saving mode (e.g. the processor is powered off), the electronic device may set different types of content to different colors. For example, the electronic device may use four different colors for indicating the current time, the date, weather, and notification information.

According to one exemplary embodiment, if voltage of the battery exceeds a reference level due to charging of the battery, the electronic device may drive the processor to operate in the wake up mode. For example, if the voltage of the battery exceeds the reference level, the electronic device may automatically wake up. In another example, the electronic device may determine whether the battery voltage exceeds the reference level when a power button input is detected. If the battery voltage exceeds the reference level, the electronic device may drive the processor and operate in the wake up mode. However, if the battery voltage is less than or equal to the reference level, the electronic device may maintain operation in the power saving mode.

Accordingly, in the power saving mode, the electronic device may maintain power supply of the display control module and the display panel and interrupt power supply of remaining modules. Thus, battery consumption of the electronic device can be restricted.

As described above, the electronic device may be capable of displaying content in both the wake up mode and the power saving mode. As such, the display of the electronic device is sometimes referred to as an Always-On Display (AOD). In addition, the electronic device controls the displaying of the display panel by using an autonomous operation of the display control module (a Display Driver Integrated circuit (DDI)) in the state where the driving of the processor is limited, it may be called a self-display.

According to various exemplary embodiments of the present disclosure, the state where the driving of the processor is terminated may refer to either when the driving of the processor is limited or when the driving of the electronic device is terminated.

Figure 2A:
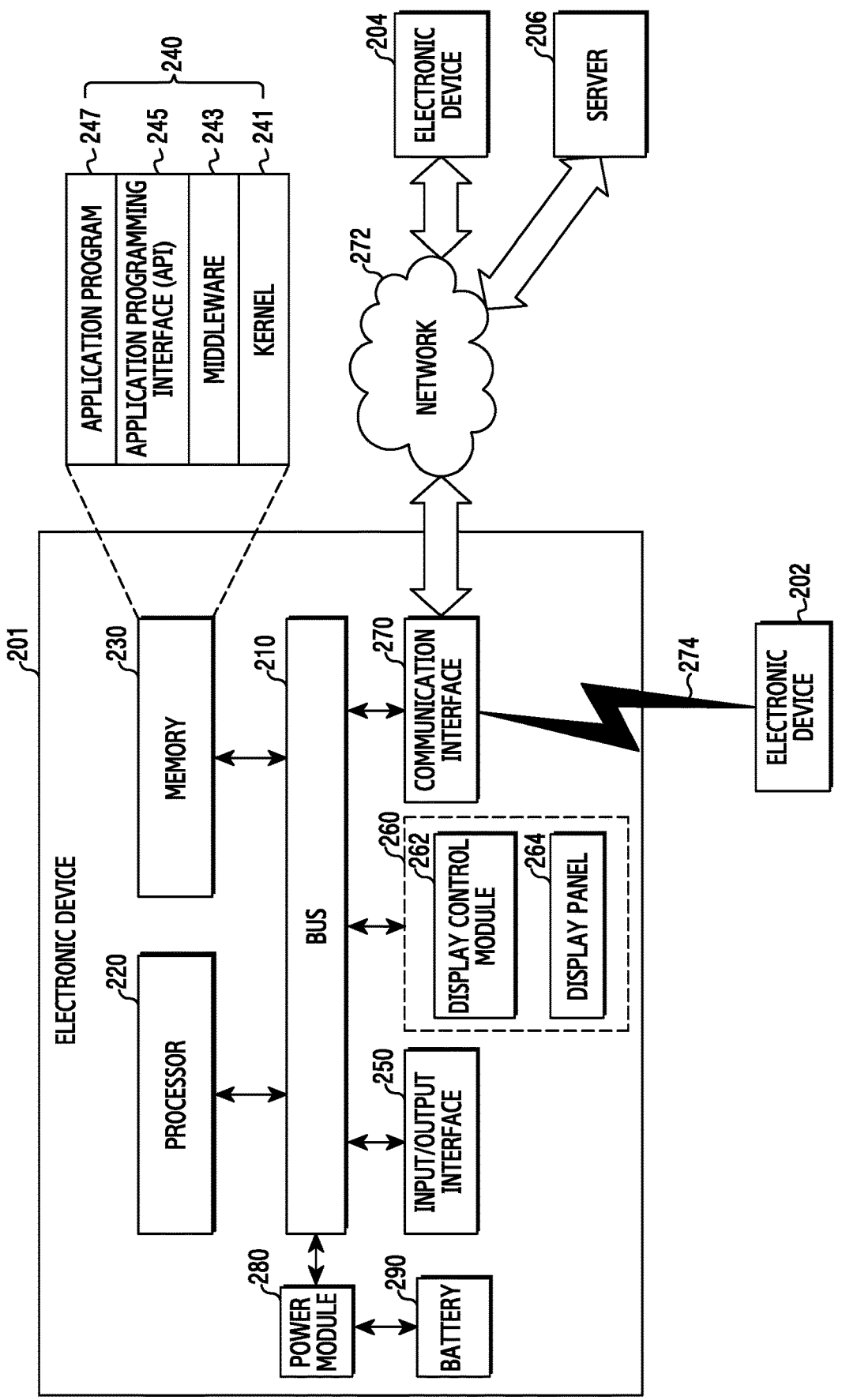
FIG. 2A illustrates an electronic device in a network environment according to one exemplary embodiment of the present disclosure.

FIG. 2A illustrates an electronic device 201 in a network environment according to one exemplary embodiment of the present disclosure.

Referring to FIG. 2A, the electronic device 201 may include a bus 210, a processor 220 (e.g., including processing circuitry), a memory 230, an input/output interface 250 (e.g., including input/output circuitry), a display module 260 (e.g., including display circuitry), a communication interface 270 (e.g., including communication circuitry), a power module 280 (e.g., including power circuitry), and a battery 290. In a certain exemplary embodiment, the electronic device 201 may omit at least one of the constitutional elements or may additionally include other constitutional elements.

The bus 210 may include a circuit for connecting, for example, the constitutional elements 220 to 290 to each other and for delivering communication (e.g., a control message and/or data) between the aforementioned constitutional elements.

The processor 220 may include one or more of a Central Processing Unit (CPU), an Application Processor (AP), an image Signal Processor (ISP), a Communication Processor (CP), a sensor hub (e.g., a Micro Controller Unit (MPU)), and a touch control module (or IC). For example, the processor 220 may execute arithmetic operations or data processing for control and/or communication of different constitutional elements of the electronic device 201. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to one exemplary embodiment, if it is determined that the driving of the processor 220 is to be limited due to the voltage of the battery 290 being below a predetermined reference level, the processor 220 may control the power module 280 to interrupt power supply to at least one element of the electronic device 201. For example, the processor 220 may monitor the voltage of the battery 290 by using a charger circuit (not shown). If the detected voltage of the battery 290 is below a first reference voltage level, the processor 220 may generate a control signal to maintain power supply of the display module 260 and interrupt power supply of the other constitutional elements. The processor 220 may then transmit the control signal to the power module 280. For example, the voltage of the battery 290 corresponding to the first reference voltage level may include voltage of the battery 290, which is less than or equal to the first reference voltage level, or voltage of the battery 290, which can reach the first reference voltage level. For example, the first reference voltage level may be the minimum voltage needed to drive the processor 220.

The processor 220 may be configured such that its driving is terminated (i.e. the processor 220 power offs) after the power module 280 is controlled to cut off the power supply to at least one element of the electronic device 201. For example, the power supplied by the power module 280 to various elements of the electronic device 201 may be cut off after the processor 220 transmits to the power module 280 the control signal to maintain power supply of the display module 260 and interrupt power supply of the other constitutional elements.

If it is determined that the driving of the processor 220 is to be limited due to the voltage of the battery 290 being below a predetermined reference level, the processor 220 may generate content data to be displayed to the display module 260. For example, the processor 220 may select content data corresponding to a content usage time configured by a user input from a content list stored in the memory 230. For example, when the size of content to be displayed to the display module 260 (e.g., the size of an area to which content is displayed) is relatively large, power consumption required in displaying the content is also relatively large, and thus the processor 220 may determine that the usage time of the content would be relatively short. Accordingly, the processor 220 may select (or generate) content having a relatively small size when the content usage time configured by the user input is long. The content list may include at least one piece of content that can be displayed to the display module 260 in the state where the driving of the processor 220 is limited. The content usage time may be the maximum amount of time that the display panel is capable of displaying content in a state where the driving of the processor 220 is terminated.

If it is determined that the driving of the processor 220 is limited based on the voltage of the battery 290, the processor 220 may determine whether to generate content data to be displayed to the display module 260 in the state where the driving of the processor 220 is limited. For example, the processor 220 may determine whether there is a history of transmission of content data to be displayed in the display module 260 in the state where the driving of the processor 220 is limited. In the absence of the history for transmission of the content data, the processor 220 may decide to generate and transmit the content data. In the presence of the history for transmission of the content data, the processor 220 may determine whether the content data transmitted to the display module 260 is valid. If it is determined that the content data transmitted to the display module 260 is invalid, the processor 220 may decide to generate and transmit the content data. If it is determined that the content data transmitted to the display module 260 is valid, the processor 220 may decide not to generate and transmit the content data. For example, if the previously transmitted content data has expired, the processor 220 may determine that the content data is invalid. In another example, if the content data to be displayed to the display module 260 and content data previously transmitted to a display control module 262 are different from each other, the processor 220 may determine that the content data previously transmitted to the display control module 262 is invalid.

The processor 220 may update a first reference power level for limiting the driving of the processor 220. For example, the processor 220 may determine the content usage time and/or the content to be displayed to the display module 260 based on the user input detected via the input/output interface 250. The processor 220 may update the first reference power level based on the content size and/or the content usage time. For example, the processor 220 may update the first reference power level to be relatively high when the size of content to be displayed to the display module 260 is relatively large or when the content usage time is set to be relatively long.

The processor 220 may provide control to change an operation mode of the electronic device 201 to a lost mode. For example, upon receiving a lost mode transition signal via the communication interface 270, the processor 220 may determine the validity of the lost mode transition signal. If it is determined that the lost mode transition signal is valid, the processor 220 may change the operation mode of the electronic device 201 to the lost mode. For example, the processor 220 may perform an authentication procedure based on the identification information included in the lost mode transition signal. If the identification information included in the lost mode transition signal is successfully authenticated, the processor 220 may determine that the lost mode transition signal is valid. If the operation mode of the electronic device 201 is changed to the lost mode, the processor 220 may generate a control signal for maintaining power supply for the display module 260 and cutting off power supply to the remaining components of the electronic device. After the processor 220 transmits to the power module 280 the control signal, the processor 220 may be limited since the power supplied by the power module 280 is cut off.

The memory 230 may include a volatile and/or a non-volatile memory. The memory 230 may store an instruction or data related to at least one different constitutional element of, for example, the electronic device 201. According to one exemplary embodiment, the memory 230 may store a software and/or a program 240. For example, the program 240 may include a kernel 241, a middleware 243, an Application Programming Interface (API) 245, and/or an application program (or an "application") 247, or the like. At least one part of the kernel 241, middleware 243, or API 245 may be referred to as an Operating System (OS).

The kernel 241 may control or manage, for example, system resources (e.g., the bus 210, the processor 220, the memory 230, etc.) used to execute an operation or function implemented in other programs (e.g., the middleware 243, the API 245, or the application program 247). Further, the kernel 241 may provide an interface capable of controlling or managing the system resources by accessing individual constitutional elements of the electronic device 201 in the middleware 243, the API 245, or the application program 247.

The middleware 243 may perform, for example, a mediation role so that the API 245 or the application program 247 can communicate with the kernel 241 to exchange data. Further, the middleware 243 may handle one or more task requests received from the application program 247 according to a priority. For example, the middleware 243 may assign a priority capable of using the system resources (e.g., the bus 210, the processor 220, or the memory 230) of the electronic device 201 to at least one of the application programs 247, and may handle the one or more task requests. The API 245 may include at least one interface or function (e.g., instruction), for example, for file control, window control, video processing, or character control, as an interface capable of controlling a function provided by the application 247 in the kernel 241 or the middleware 243.

The input/output interface 250 may play a role of, for example, an interface capable of delivering an instruction or data input from a user or a different external device(s) to the different constitutional elements of the electronic device 201. For example, the input/output interface 250 may receive a touch, gesture, proximity, or hovering input by using an electronic pen or a part of a user's body.

The display module 260 may include the display control module 262 and a display panel 264.

According to one exemplary embodiment, the display control module 262 may drive the display panel 264. For example, the display control module 262 may provide the display panel 264 with an image signal corresponding to content data stored in the memory of the display control module 262. For example, if the driving of the processor 220 is limited, the display control module 262 may select at least one piece of content data stored in the memory of the display control module 262 and output it to a designated area of the display panel 264. The display control module 262 may change the content displayed to the display panel 264 based on driving information stored in the memory. For example, the display control module 262 may include a Display Driver Integrated circuit (DDI). The memory may include a graphic random access memory of the display control module 262.

According to one exemplary embodiment, the display panel 264 may display a variety of content (e.g., text, image, video, icon, symbol, or the like) to the user. For example, the display panel 264 may include various types of displays, for example, a Liquid Crystal Display (LCD), a Light Emitting Diode (LED) display, an Organic Light-Emitting Diode (OLED) display, a MicroElectroMechanical Systems (MEMS) display, or an electronic paper display. For example, the display panel 264 may be implemented in a flexible, transparent, or wearable manner. In addition, the display panel 264 may be included in a cover of a case electrically coupled to the electronic device 201.

The communication interface 270 may establish communication, for example, between the electronic device 201 and the external device (e.g., a $1^{st}$ external electronic device 202, a $2^{nd}$ external electronic device 204, or a server 206). For example, the communication interface 270 may communicate with the external device (e.g., the $2^{nd}$ external electronic device 204 or the server 206) by being connected with a network 272 through wireless communication or wired communication.

The wireless communication may include, for example, cellular communication using at least one of LTE, LTE Advance (LTE-A), code division multiple access (CDMA), Wideband CDMA (WCDMA), Universal Mobile Telecommunications System (UMTS), Wireless Broadband (WiBro), Global System for Mobile Communications (GSM), etc. According to one exemplary embodiment, the wireless communication (e.g., 274 of FIG. 2) may include, for example, at least one of Wireless Fidelity (WiFi), Bluetooth, Bluetooth Low Energy (BLE), Zigbee, Near Field Communication (NFC), magnetic secure transmission, Radio Frequency (RF), Body Area Network (BAN), etc. According to one exemplary embodiment, the wireless communication may include a Global Navigation Satellite System (GNSS). The GNSS may be, for example, Global Positioning System (GPS), Global Navigation Satellite System (Glonass), Beidou Navigation Satellite System (hereinafter, "Beidou") or Galileo, the European global satellite-based navigation system, etc. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), etc. The network 272 may include, for example, at least one of a telecommunications network, a computer network (e.g., LAN or WAN), the Internet, and a telephone network.

Each of the $1^{st}$ and $2^{nd}$ external electronic devices 202 and 204 may be the same type or different type of the electronic device 201. According to various exemplary embodiments, all or some of operations executed by the electronic device 201 may be executed in a different one or a plurality of electronic devices (e.g., the electronic devices 202 or 204 or the server 206). According to one exemplary embodiment, if the electronic device 201 needs to perform a certain function or service either automatically or at a request, the electronic device 201 may request at least a part of functions related thereto alternatively or additionally to a different electronic device (e.g., the electronic device 202 or 204 or the server 206) instead of executing the function or the service autonomously. The different electronic device (e.g., the electronic device 202 or 204 or the server 206) may execute the requested function or additional function, and may deliver a result thereof to the electronic device 201. The electronic device 201 may provide the requested function or service either directly or by additionally processing the received result. For this, for example, a cloud computing, distributed computing, or client-server computing technique may be used.

The power module 280 may control power supply for various internal components of the electronic device 201. For example, the power module 280 may provide power supplied from the battery 290 or an external power device to the internal components of the electronic device 201. For example, upon receiving the control signal from the processor 220 to maintain power supply for the display module 260, the power module 280 may maintain the power supply of the display module 260. In this case, the power module 280 may cut off power supply for the remaining internal components. The power module 280 may include a Power Management Integrated Circuit (PMIC). The power module 280 may further include a charger circuit for controlling charging/discharging of the battery 290.

Figure 2B:
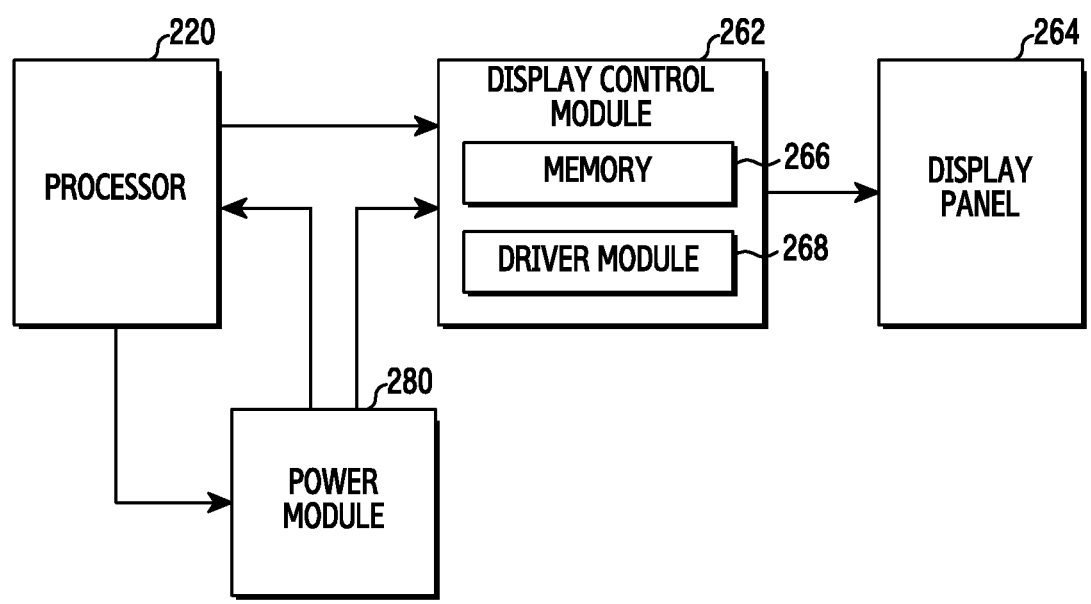
FIG. 2B is a block diagram of an electronic device for displaying content data according to one exemplary embodiment of the present disclosure.

FIG. 2B is a block diagram of an electronic device for displaying content data according to one exemplary embodiment of the present disclosure.

According to one exemplary embodiment, the processor 220 may be driven using the power supplied from the power module 280. If battery voltage of the electronic device 201 corresponds to a first reference voltage level, the processor 220 may transmit to the power module 280 a control signal to maintain power supply of the display module 260. After the processor 220 transmits the control signal, the power supplied by the power module 280 to other elements of the electronic device, including the processor 220, may be cut off, and thus the driving of the processor 220 may be terminated.

Upon receiving from the processor 220 the control signal to maintain power supply for the display module 260, the power module 280 may maintain the power supply of the display module 260. The power module 280 then may cut off power supply for the other remaining internal components of the electronic device.

The processor 220 may generate image data to be displayed to the display panel 264 and transmit it to the display control module 262 when driving of the processor 220 is limited (terminated). For example, the processor 220 may encode the image data according to a predetermined scheme (e.g., Display Stream Compression (DSC) of Video Electronics Standards Association (VESA)) and transmit it to the display control module 262. In this case, the memory 266 of the display control module 262 may be large enough to store the encoded image data because the image data is compressed by the encoding. The memory 266 may store one or more image data. For example, if the size of the image data is decreased by 1/n fold due to the encoding, the memory 266 may store N pieces of encoded image data.

A driver module 268 of the display control module 262 may output at least one part of the encoded image data stored in the memory 266 to the display panel 264. For example, the driver module 268 may select at least one part of the encoded image data stored in the memory 266 based on driving information corresponding to the content data. The driver module 268 may decode the selected part of the image data and output it to a designated area of the display panel 264. For example, the driver module 268 may identify the designated area of the display panel 264 for outputting the image data based on driving information corresponding to the content data.

The processor 220 may generate image data having a lower resolution than the native resolution of the display panel 264 and transmit it to the display control module 262. In this case, the memory 266 of the display control module 262 may store the image data having the lower resolution. For example, the memory 266 may store one or more image data having a low resolution decreased by 1/m fold in comparison with the resolution of the display panel 264 in such a manner that m pieces of data are consecutive.

The driver module 268 of the display control module 262 may output at least one part of the low-resolution image data stored in the memory 266 to the display panel 264. For example, the driver module 268 may select at least one part of the low-resolution image data stored in the memory 266 based on the driving information corresponding to the content data. If the image data corresponds to lower resolution than the native resolution of the display panel 264, the driver module 268 may enlarge the selected part of the image data by a designated ratio and output it to a designated area of the display panel 264.

The driver module 268 of the display control module 262 may dynamically output image data displayed to the display panel 264 in the state where the driving of the processor 220 is limited or terminated. For example, the display panel 264 may use a timing control module (not shown) to continuously provide a plurality of pieces of image data by shifting the data on a block-by-block basis.

Figure 2C:
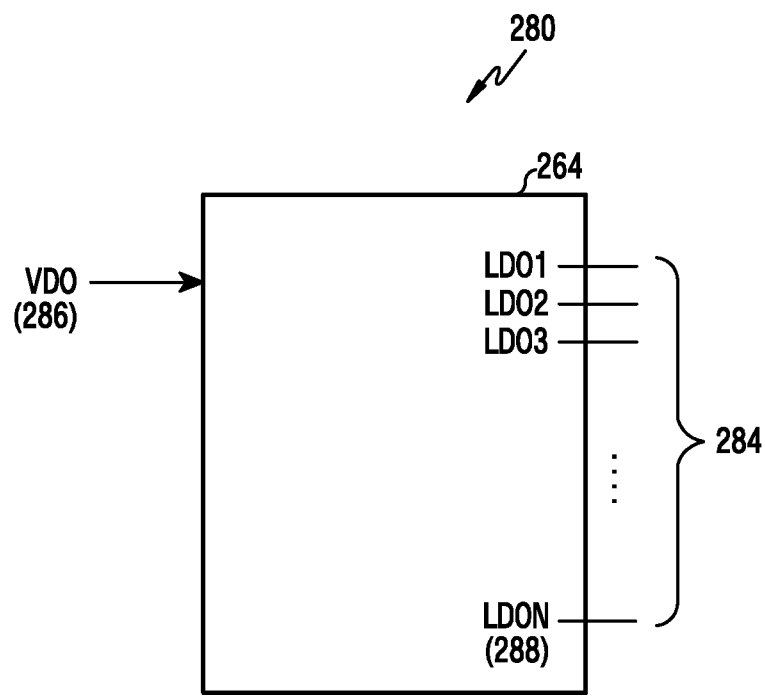
FIG. 2C is a block diagram illustrating a power module according to one exemplary embodiment of the present disclosure.

FIG. 2C is a block diagram illustrating a power module according to one exemplary embodiment of the present disclosure.

Referring to FIG. 2C, the power module 280 may include a plurality of Low Drop Output (LDO) ports 284 and a power (VDO) port 286. For example, the power module 280 may supply power to an internal component of the electronic device 201 via each LDO port. For instance, each LDO may include a regulator for decreasing the voltage to be supplied to the internal circuit according to rated capacity of each internal component.

According to one exemplary embodiment, upon receiving from the processor 220 a control signal for interrupting power supply of internal components other than the display module 260, the power module 280 may maintain a wake-up state for the LDO N 288, which corresponds to the display module 260. The power module 280 may then turn off the remaining LDOs (e.g., LDO 1 to LDO N−1). On the other hand, upon detecting voltage of the battery 290 corresponding to a second reference voltage level corresponding to limiting the driving of the display module 260, the power module 280 may turn off LDO N 288 as well so that power supply for the display module 260 is cut off.

Figure 3:
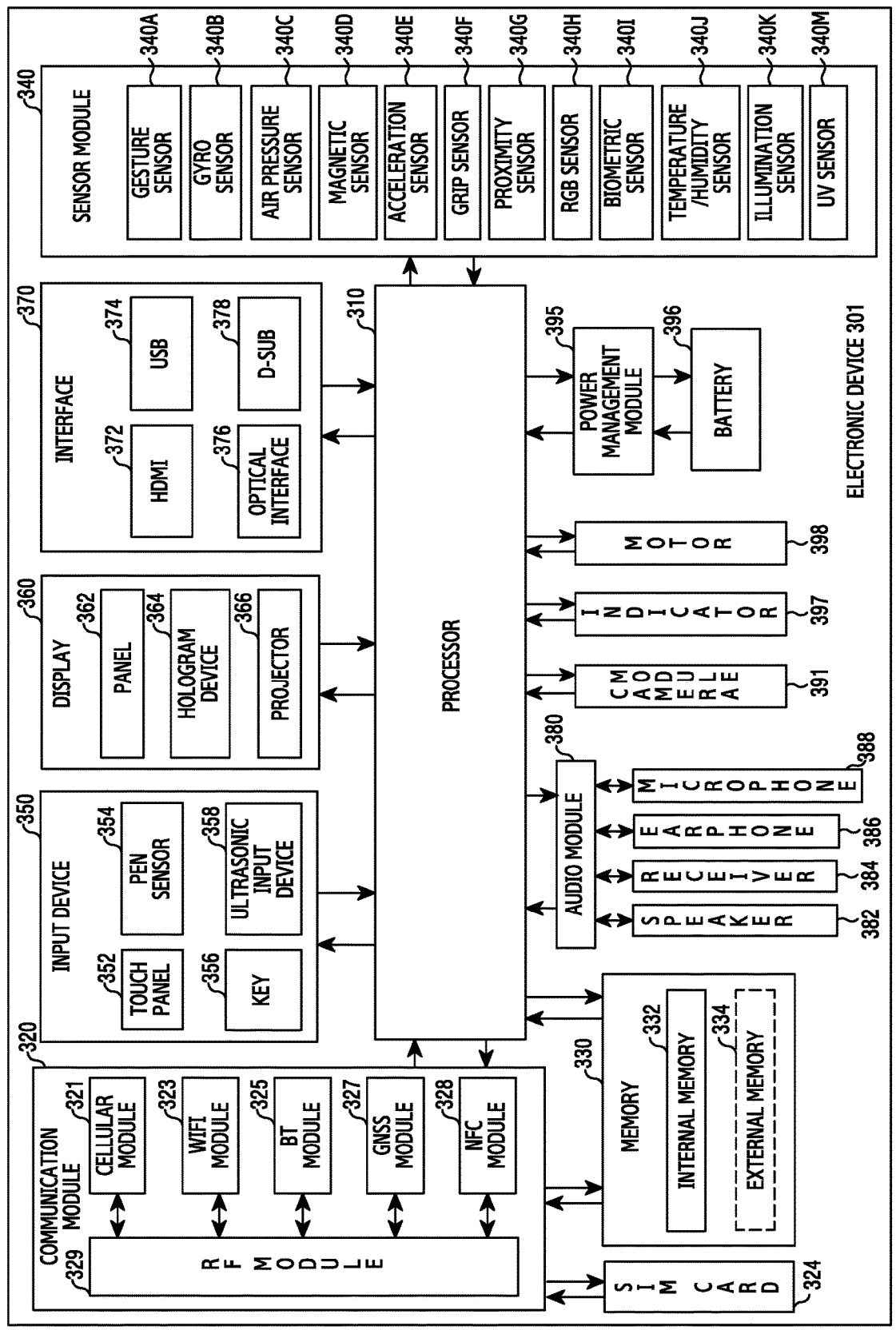
FIG. 3 is a block diagram of an electronic device according to one exemplary embodiment of the present disclosure.

FIG. 3 is a block diagram of an electronic device 301 according to one exemplary embodiment. The electronic device 301 may include, for example, all or some parts of the electronic device 201 of FIG. 2A.

Referring to FIG. 3, the electronic device 301 may include one or more processors (e.g., Application Processors (APs)) 310, a communication module 320, a subscriber identity module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software constitutional elements connected to the processor 310 by driving, for example, an operating system or an application program, and may process a variety of data including multimedia data and may perform an arithmetic operation. The processor 310 may be implemented, for example, with a System on Chip (SoC). According to one exemplary embodiment, the processor 310 may further include a Graphic Processing Unit (GPU) and/or an image signal processor The processor 310 may include at least one part (e.g., a cellular module 321) of the constitutional elements of FIG. 3. The processor 310 may process an instruction or data, which is received from at least one of different constitutional elements (e.g., a non-volatile memory), by loading it to a volatile memory and may store a variety of data in the non-volatile memory.

According to one exemplary embodiment, upon detecting voltage of the battery 396 corresponding to a first reference voltage level, the processor 310 may control the power management module 395 (e.g., the power module 280) to maintain power supply of the display 360. In addition, the processor 310 may generate content data to be displayed via the panel 362 and transmit it to the display 360 in a state where the driving of the processor 310 is terminated.

The communication module 320 may have the same or similar structure as the communication interface 270 of FIG. 2A. The communication module 320 may include, for example, the cellular module 321, a Wi-Fi module 323, a BlueTooth (BT) module 325, a Global Direction guide Satellite System (GNSS) module 327, a Near Field Communication (NFC) module 328, and a Radio Frequency (RF) module 329.

The cellular module 321 may provide, for example, a voice call, a video call, a text service, an Internet service, or the like through a communication network. According to one exemplary embodiment, the cellular module 321 may identify and authenticate the electronic device 301 in the communication network by using the subscriber identity module (e.g., a SIM card) 324. According to one exemplary embodiment, the cellular module 321 may perform at least some functions that can be provided by the processor 310. According to one exemplary embodiment, the cellular module 321 may include a Communication Processor (CP).

According to a certain exemplary embodiment, at least some (e.g., two or more) of the cellular module 321, the WiFi module 323, the BT module 325, the GNSS module 327, and the NFC module 328 may be included in one Integrated Chip (IC) or IC package.

The RF module 329 may transmit/receive, for example, a communication signal (e.g., a Radio Frequency (RF) signal). The RF module 329 may include, for example, a transceiver, a Power Amp Module (PAM), a frequency filter, a Low Noise Amplifier (LNA), an antenna, or the like. According to another exemplary embodiment, at least one of the cellular module 321, the WiFi module 323, the BT module 325, the GPS module 327, and the NFC module 328 may transmit/receive an RF signal via a separate RF module. The subscriber identity module 324 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 330 (e.g., the memory 230 of FIG. 2A) may include, for example, an internal memory 332 or an external memory 334. The internal memory 332 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)). The external memory 334 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 334 may be operatively and/or physically connected to the electronic device 301 via various interfaces.

The sensor module 340 may measure, for example, physical quantity or detect an operational status of the electronic device 301, and may convert the measured or detected information into an electric signal. The sensor module 340 may include, for example, at least one of a gesture sensor 340A, a gyro sensor 340B, an air pressure sensor 340C, a magnetic sensor 340D, an acceleration sensor 340E, a grip sensor 340F, a proximity sensor 340G, a color sensor 340H (e.g., a Red, Green, Blue (RGB) sensor), a biometric sensor 340I, a temperature/humidity sensor 340J, an illumination sensor 340K, and an Ultra Violet (UV) sensor 340M. Additionally or alternatively, the sensor module 340 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 340 may further include a control circuit for controlling at least one or more sensors included therein. In a certain exemplary embodiment, the electronic device 301 may further include a processor configured to control the sensor module 304 either separately or as one part of the processor 310, and may control the sensor module 340 while the processor 310 is in a sleep state. For example, the temperature/humidity sensor 340J may include a plurality of temperature sensors disposed at different locations.

The input device 350 may include, for example, a touch panel 352, a (digital) pen sensor 354, a key 356, or an ultrasonic input device 358. The touch panel 352 may recognize a touch input, for example, by using at least one of an electrostatic type, an air pressure-sensitive type, and an ultrasonic type. In addition, the touch panel 352 may further include a control circuit. The touch panel 352 may further include a tactile layer and thus may provide the user with a tactile reaction. The (digital) pen sensor 354 may be, for example, one part of a touch panel, or may include an additional sheet for recognition. The key 356 may be, for example, a physical button, an optical key, a keypad, or a touch key. The ultrasonic input device 358 may detect an ultrasonic wave generated from an input means through a microphone (e.g., a microphone 388) to identify data corresponding to the detected ultrasonic wave.

The display 360 (e.g., the display module 260 of FIG. 2A) may include a panel 362, a hologram unit 364, a projector 366, and/or a control circuit for controlling these elements. The panel 362 may be implemented, for example, in a flexible, transparent, or wearable manner. The panel 362 may be constructed as one module with the touch panel 352. The hologram unit 364 may use an interference of light and show a stereoscopic image in the air. The projector 366 may display an image by projecting a light beam onto a screen. The screen may be located, for example, inside or outside the electronic device 301. The interface 370 may include, for example, a High-Definition Multimedia Interface (HDMI) 372, a Universal Serial Bus (USB) 374, an optical communication interface 376, or a D-subminiature (D-sub) 378. The interface 370 may be included, for example, in the communication interface 270 of FIG. 2A. Additionally or alternatively, the interface 370 may include, for example, a Mobile High-definition Link (MHL) interface, a Secure Digital (SD)/Multi-Media Card (MMC) interface, or an Infrared Data Association (IrDA) standard interface.

The audio module 380 may bilaterally convert, for example, a sound and electric signal. At least some constitutional elements of the audio module 380 may be included in, for example, the input/output interface 250 of FIG. 2A. The audio module 380 may convert sound information which is input or output, for example, through a speaker 382, a receiver 384, an earphone 386, the microphone 388, or the like.

The camera module 391 is, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp). The power management module 395 may manage, for example, power of the electronic device 301.

The power management module 395 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 396 and voltage, current, and temperature during charging. The battery 396 may include, for example, a rechargeable battery and/or a solar battery.

According to one exemplary embodiment, if the driving of the processor 310 is terminated, the power management module 395 (e.g., PMIC) may maintain power supply for the display 360 and interrupt power supply for the remaining internal components. For example, the power management module 395 may maintain the power supply for the display 360 based on a control signal provided from the processor 310 before the driving of the processor 310 is terminated.

The indicator 397 may indicate a specific state, for example, a booting state, a message state, a charging state, or the like, of the electronic device 301 or one part thereof (e.g., the processor 310). The motor 398 may convert an electric signal into a mechanical vibration, and may generate a vibration or haptic effect. The electronic device 301 may include a mobile TV supporting device (e.g., a GPU) capable of handling media data according to a protocol of, for example, Digital Multimedia Broadcasting (DMB), Digital Video Broadcasting (DVB), media flow, or the like.

Each of the constitutional elements described in the present document may consist of one or more components, and names thereof may vary depending on a type of the electronic device. According to various exemplary embodiments, some of the constitutional elements of the electronic device (e.g., the electronic device 301) may be omitted, or additional other constitutional elements may be further included. Further, some of the constitutional elements of the electronic device may be combined and constructed as one entity while performing the same functions of corresponding constitutional elements as before they are combined.

According to various exemplary embodiments of the present disclosure, an electronic device may include a display module, a power module configured to interrupt power supply to at least one element of the electronic device based on a control signal, and a processor. The processor may be configured to transmit to the power module the control signal for interrupting the power supply to the processor if a designated condition is satisfied, and transmit content information to the display module so that the display module displays the content information when the power supply to the processor is interrupted.

According to various exemplary embodiments, the processor may be further configured to identify a battery voltage of the electronic device, and if the battery voltage corresponds to a first reference voltage, transmit to the power module the control signal for interrupting the power supply to the processor.

According to various exemplary embodiments, based on the control signal, the power module may be configured to maintain the power supply to the display module and interrupt the power supply to remaining elements of the electronic device.

According to various exemplary embodiments, the power module may be configured to identify a battery voltage of the electronic device, and if the battery voltage corresponds to a second reference voltage, interrupt the power supply to the display module.

According to various exemplary embodiments, the display module may include a display control module and a display panel. The display control module may include a driving circuit and a memory.

According to various exemplary embodiments, the content information may be stored in the memory. The display control module is configured to control the display panel to display at least one part of the content information stored in the memory in at least one area of the display panel when the power supply to the processor is interrupted.

According to various exemplary embodiments of the present disclosure, an electronic device may include a display module, a processor, and a power module for controlling power supply of the electronic device. The power module may be configured to cut off the power supply to the processor while maintaining the power supply to the display module based on a power control signal received from the processor. The display module may be configured to output at least one part of content to at least one area of the display module when the power supply to the processor is cut off.

According to various exemplary embodiments, upon detecting a battery voltage of the electronic device corresponding to a first reference voltage, the processor may be configured to transmit the power control signal to the power module.

According to various exemplary embodiments, the processor may be configured to update the first reference voltage based on a maximum amount of time for which the display module is capable of displaying the content.

According to various exemplary embodiments, prior to the power supply to the processor is cut off, the processor may be configured to generate the content and transmit the content to the display module upon detecting a battery voltage of the electronic device corresponding to a first reference voltage.

According to various exemplary embodiments, the processor may be further configured to generate the content based on a maximum amount of time for which the display module is capable of displaying the content.

According to various exemplary embodiments, based on the power control signal, the power module may be configured to maintain the power supply to the display module and cut off the power supply to at least one remaining element of the electronic device.

According to various exemplary embodiments, the power module may be configured to cut off the power supply of the display module upon detecting a battery voltage of the electronic device corresponding to a second reference voltage.

According to various exemplary embodiments, the display module may include a display control module and a display panel. The display control module may include a driving circuit and a memory.

According to various exemplary embodiments, the content may be stored in the memory. The display control module may be configured to control the display panel to display at least one part of the content stored in the memory in at least one area of the display panel when the power supply to the processor is cut off.

Figure 4:
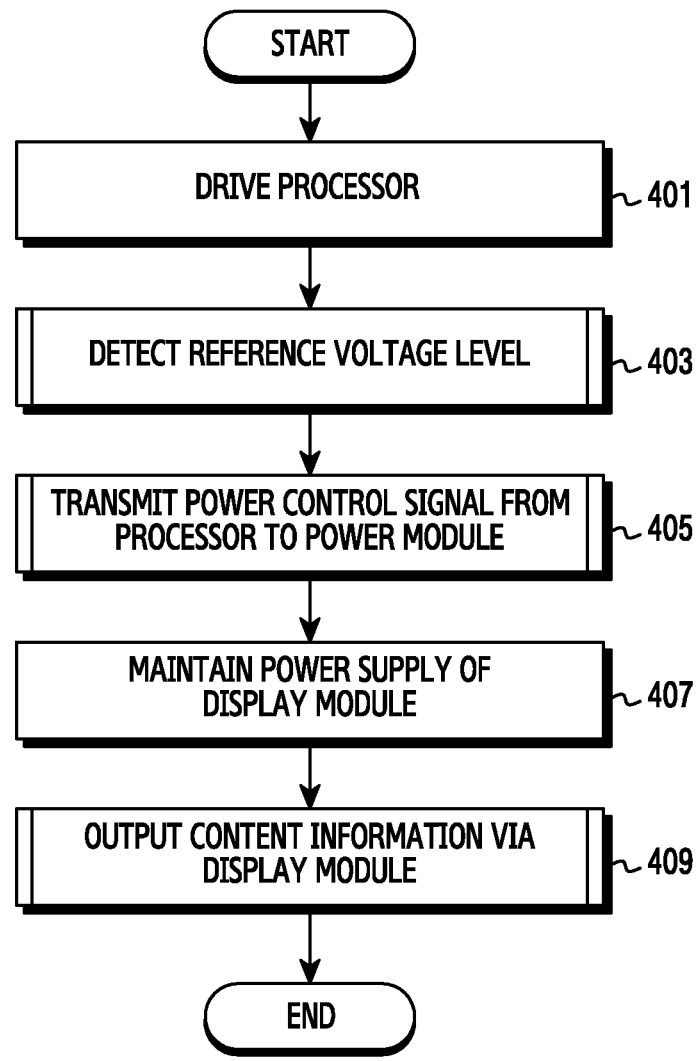
FIG. 4 is a flowchart illustrating a method for displaying content data in an electronic device according to one exemplary embodiment of the present disclosure.
Figure 5:
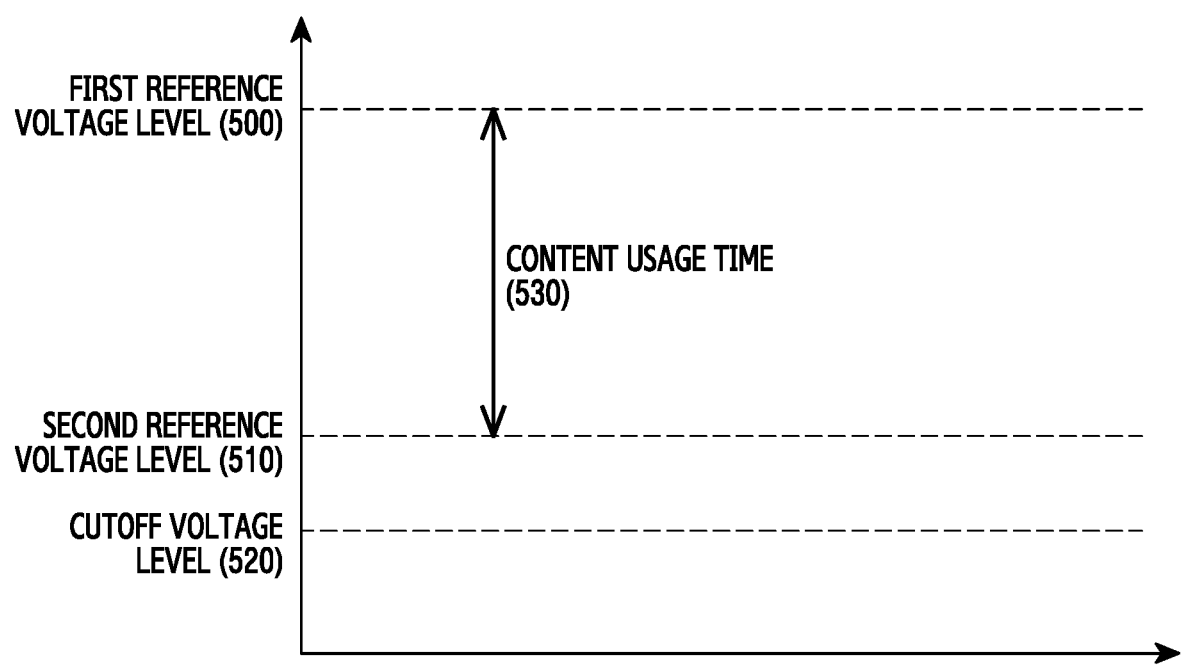
FIG. 5 is a graph illustrating a reference voltage level of a battery according to one exemplary embodiment of the present disclosure.

FIG. 4 is a flowchart illustrating a method for displaying content data in an electronic device according to one exemplary embodiment of the present disclosure. FIG. 5 is a graph illustrating a reference voltage level of a battery according to one exemplary embodiment of the present disclosure. In the following explanation, the electronic device may be the electronic device 201 of FIG. 2A or may include at least one part of the electronic device 201.

Referring to FIG. 4, in operation 401, the electronic device may drive a processor. For example, if power is supplied via the power module 280, the processor 220 may operate in the wake-up mode.

In operation 403, the electronic device (e.g., the processor 220) may detect battery voltage of the electronic device and determine whether it corresponds to a reference voltage level. For example, the processor 220 may monitor voltage of the battery 290 via a charger circuit of the electronic device 201. As shown in FIG. 5, the processor 220 may determine whether the detected voltage of the battery 290 corresponds to a first reference voltage level 500, which corresponds to limiting the driving of the processor 220. The first reference voltage level 500 may be varied depending on the size of content to be displayed to the display module 260 and/or the content usage time, which is the maximum time the display can be driven during the power saving mode. As explained below, the content usage time may be adjusted by the user. The size of content may be determined based on the size of the designated area in the display for the content.

In operation 405, the electronic device (e.g., the processor 220) may transmit a power control signal to a power module. For example, upon detecting the voltage of the battery 290 corresponding to the first reference voltage level 500, the processor 220 may transmit to the power module 280 a power control signal for maintaining power supply of the display module 260 and cutting off power supply of the remaining internal components. Also upon detecting the voltage of the battery 290 corresponding to the first reference voltage level 500, the processor 220 may generate driving information and content data to be displayed to the display module 260. The processor 220 may transmit the content data and the driving information to the display module 260. After the processor 220 transmits the power control signal, the driving information, and the content data, the driving of the processor 220 may be terminated and the processor 220 may enter its sleep state. For example, the driving information and the content data may be transmitted in the power control signal or in a separated signal.

In operation 407, the electronic device (e.g., the power module 280) may maintain power supply of the display module. For example, based on the power control signal from the processor 220, the power module 280 may maintain power supply of the display module 260 and interrupt power supply for the remaining internal components. In the embodiment shown in FIG. 2C, the power module 280 may maintain the wake-up state of the LDO N 288 corresponding to the display module 260 (the display control module 262) and may deactivate the remaining LDOs except for the LDO N 288.

In operation 409, the electronic device (e.g., the display module 260) may output at least one part of content to at least one area of the display module in a state where the driving of the processor is terminated. For example, the display control module 262 (the driver module 268) may select at least one part of content data stored in the memory 266 of the display control module 262 in the state where the driving of the processor 220 is terminated. The display control module 262 may output the selected content data to a designated area of the display panel 264 corresponding to driving information from the processor 220. The display control module 262 (the driver module 268) may dynamically output it based on the driving information. For instance, the display control module 262 (the driver module 268) may move the content displayed to the display panel 264 on a block-by-block basis. The display control module 262 (the driver module 268) may also continuously or periodically update content (e.g., time) displayed to the display panel 264. As shown in FIG. 5, driving for the display control module 262 may be terminated upon detecting voltage of the battery 290 corresponding to a second reference voltage level 510. That is, the display control module 262 may output content via the display panel 264 until the voltage of the battery 290 reaches the second reference voltage level 510. For instance, as shown in FIG. 5, the second reference voltage level 510 may be set to be higher than a cutoff voltage level 520, which may be used to protect the battery 290 in the electronic device 201. Therefore, the display control module 262 may output content including digital clock, analog clock, dates, calendar, notification information, status information (e.g., a battery remaining amount) of the electronic device 201, emergency contacts, schedule information, member identification information (e.g., employee card, membership information, etc.), discount coupon, and memo information to the display panel 264 in the state where the driving of the processor 220 is terminated.

According to various exemplary embodiments of the present disclosure, if content is output via the display module in the state where the driving of the processor is terminated, the electronic device may maintain the touch input function at the corresponding active area of the display panel. For example, the electronic device may keep the area of the touch panel overlapping with the active area of the display panel active.

Figure 6:
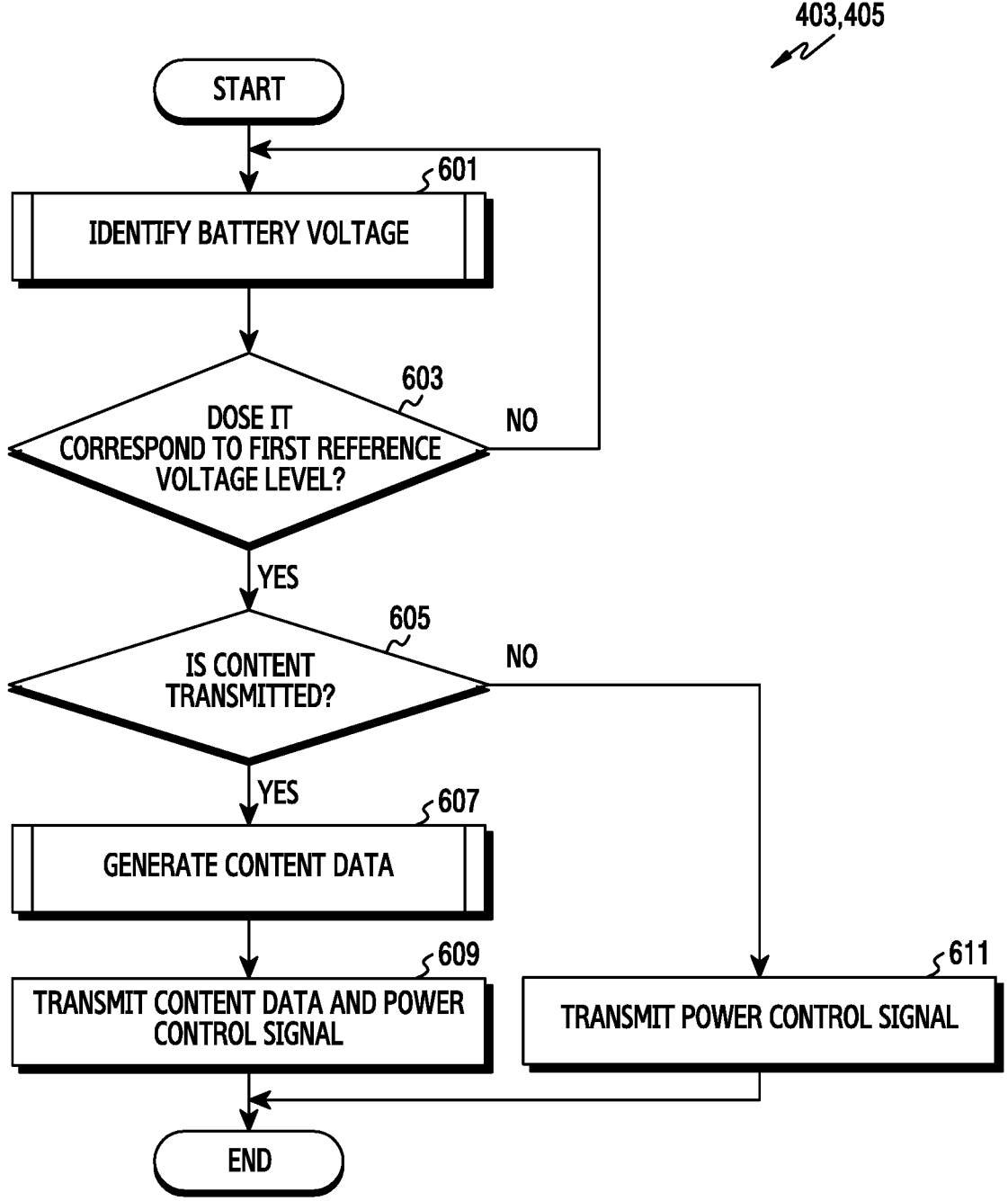
FIG. 6 is a flowchart illustrating a method for transmitting content data in an electronic device according to one exemplary embodiment of the present disclosure.

FIG. 6 is a flowchart illustrating a method for transmitting content data in an electronic device according to one exemplary embodiment of the present disclosure. The following explanation is about the operation for transmitting a power control signal in operations 403 and 405 of FIG. 4. In the following explanation, the electronic device may be the electronic device 201 of FIG. 2A or may include at least one part (e.g., the processor 220) of the electronic device 201.

Referring to FIG. 6, in operation 601, the electronic device (e.g., the processor 220) may identify battery voltage of the electronic device if the processor is driven (e.g., operation 401 of FIG. 4). For example, the processor 220 may periodically monitor voltage of the battery 290 via a charger circuit (not shown).

In operation 603, the electronic device (e.g., the processor 220) may determine whether battery voltage corresponding to a first reference voltage level is detected. For example, the processor 220 may determine whether voltage of the battery 290, which is less than or equal to the first reference voltage level, or voltage of the battery 290, which can reach the first reference voltage level, is determined on the basis of a method of setting the first reference voltage level.

If the detected battery voltage is higher than the first reference voltage level, the process returns to operation 601, and the electronic device (e.g., the processor 220) may re-identify the battery voltage.

In operation 605, upon detecting battery voltage corresponding to the first reference voltage level, the electronic device (e.g., the processor 220) may determine whether to transmit content data to be displayed to the display module to the display module in a state where the driving of the processor is limited. For example, if a transmission history of content data to be displayed to the display module 260 does not exist in the state where the driving of the processor 220 is limited, the processor 220 may decide to transmit the content data to the display module 260. On the other hand, if the transmission history of the content data exists, the processor 220 may determine the validity of the content data. For example, the content data may be invalid if it has expired. For example, the content data may be invalid if it is different. If it is determined that the content data transmitted to the display module 260 is invalid, the processor 220 may decide to transmit new content data to the display module 260. If it is determined that the content data transmitted to the display module 260 is valid, the processor 220 may decide not to transmit additional content data.

In operation 607, if it is determined to transmit the content data, the electronic device (e.g., the processor 220) may generate the content data to be displayed to the display module. For example, the processor 220 may select at least one piece of content corresponding to the content usage time from a content list stored in the memory 230. As explained below, the content usage time may be set by the user. For example, the content data and driving information may be generated based on a user input.

In operation 609, the electronic device (e.g., the processor 220) may transmit the content data to the display module, and may transmit a power control signal to the power module. For example, the processor 220 may transmit content data and driving information of the content data to the display control module 262 via the bus 210, and may transmit the power control signal to the power module 280. The processor 220 may transmit the content data and the power control signal to the display control module 262 and the power module 280 at the same time.

In operation 611, if it is determined that the content data has already been transmitted (if it is determined not to transmit the content data), the electronic device (e.g., the processor 220) may transmit only the power control signal to the power module. For example, the processor 220 may transmit the power control signal to the power module 280 via the bus 210. For instance, the power control signal may include information for maintaining power supply of the display module 260 (the display control module 262) and cutting off power to the other components of the electronic device.

Figure 7:
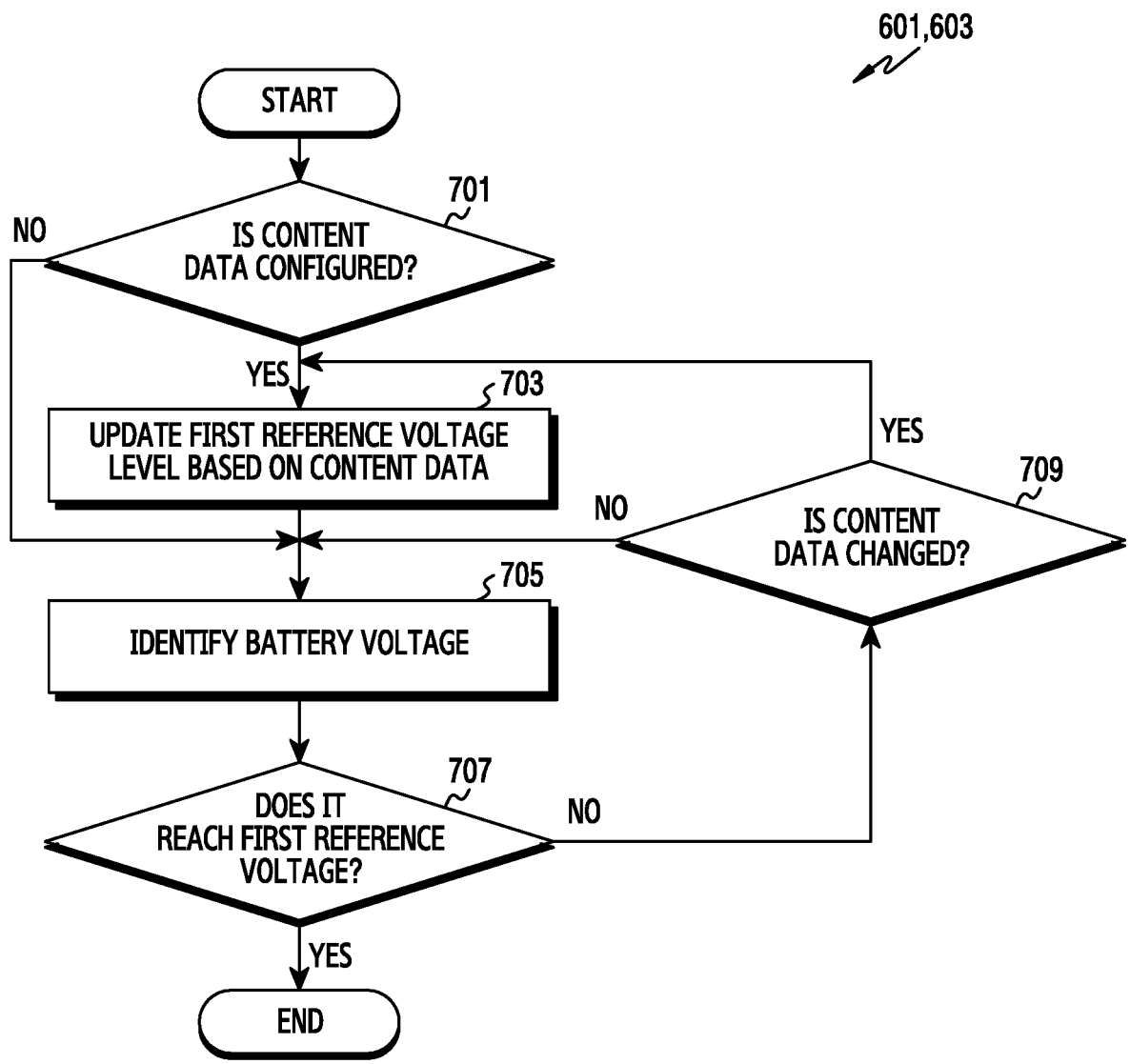
FIG. 7 is a flowchart illustrating a method for determining a reference voltage level in an electronic device according to one exemplary embodiment of the present disclosure.

FIG. 7 is a flowchart illustrating a method for determining a reference voltage level in an electronic device according to one exemplary embodiment of the present disclosure. FIG. 8A to FIG. 8D are views illustrating content displayed in an electronic device according to various exemplary embodiments of the present disclosure. The following explanation is about the operation for determining whether battery voltage corresponding to a first reference voltage level is detected in operations 601 and 603 of FIG. 6. In the following explanation, the electronic device may be the electronic device 201 of FIG. 2A or may include at least one part (e.g., the processor 220) of the electronic device 201.

Figure 8A:
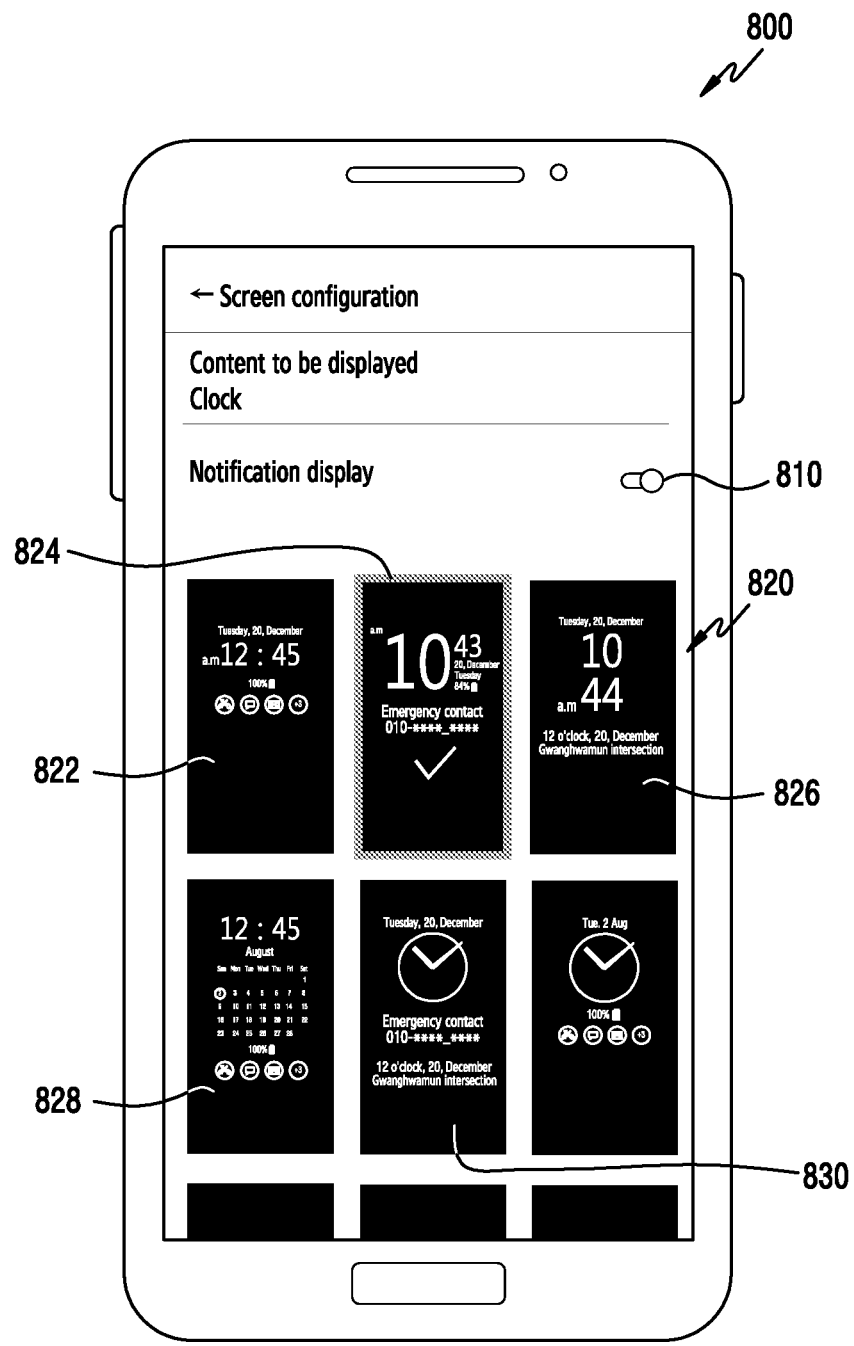
FIG. 8A, FIG. 8B, FIG. 8C and FIG. 8D are views illustrating content displayed in an electronic device according to various exemplary embodiments of the present disclosure.

Referring to FIG. 7, in operation 701, if the processor is driven (e.g., operation 401 of FIG. 4), the electronic device (e.g., the processor 220) may determine whether content data to be displayed during power saving mode (e.g. during driving of the processor is terminated) is configured by a user input. For example, upon detecting occurrence of a content configuration event, as shown in FIG. 8A, the processor 220 may control the display module 260 to display a content configuration screen 800. For example, the content configuration screen 800 may include a configuration menu 810 for determining whether to display content to the display panel 264 in a state where the driving of the processor 220 is terminated. If the configuration menu 810 of the processor 220 is activated, the processor 220 may control the display module 260 to display a content list 820, listing various options for displaying content on the display panel 264 in the state where the driving of the processor 220 is terminated. The user may select his or her desired option. For example, first content 822 may include date, digital clock, status information (e.g., battery remaining amount), and notification information. Second content 824 may include date, digital clock, status information (e.g., battery remaining amount), and emergency contact information. Third content 826 may include date, digital clock, status information (e.g., battery remaining amount), and schedule information. Fourth content 828 may include date, digital clock, calendar, and notification information. Fifth content 830 may include date, analog clock, emergency contact, and schedule information.

If content data corresponding to a user input is not configured, the electronic device (e.g., the processor 220) may decide to output default content via the display module in the state where the driving of the processor is terminated. In this case, the first reference voltage level may be set to correspond to the default content.

In operation 703, if the content data corresponding to the user input is configured, the electronic device (e.g., the processor 220) may update the first reference voltage level according to the content data. For example, power consumption by the display panel 264 may be proportional to the size of the displayed content. Therefore, the processor 220 may update the first reference voltage level for terminating the driving of the processor 220 depending on the size of the content in order to maintain substantially the same content usage time for different displayed contents. For example, the processor 220 may update the first reference voltage level such that it is relatively great when the size of the content configured by the user is relatively great. Specifically, if the size of the fifth content 830 is greater than the size of the second content 824, the processor 220 may set the voltage level such that the first reference voltage level corresponding to the fifth content 830 is greater than the first reference voltage level corresponding to the second content 824. The size of content may be determined based on the display area of content and/or the colors of content. For example, certain colors may require more power to display than other colors.

In operation 705, if the first reference voltage level is updated according to content, the electronic device (e.g., the processor 220) may identify battery voltage of the electronic device. For example, the processor 220 may periodically monitor voltage of the battery 290 via a charger circuit (not shown).

In operation 707, the electronic device (e.g., the processor 220) may determine whether battery voltage corresponding to the first reference voltage level is detected.

In operation 709, if the battery voltage corresponding to the first reference voltage level is not detected, the electronic device (e.g., the processor 220) may determine whether content data is changed. For example, upon detecting battery voltage higher than the first reference voltage level, the processor 220 may determine whether occurrence of a content configuration event is detected. Upon detecting the occurrence of the content configuration event, as shown in FIG. 8A, the processor 220 may configure new content data to be displayed to the display module in a state where the driving of the processor is limited via the content configuration screen 800. For example, the processor 220 may determine whether the content configuration event occurs based on at least one of a selection input of the content configuration menu and a gesture input corresponding to the content configuration event.

If the content data is changed, in operation 703, the electronic device may update the first reference voltage level based on the changed content data. If the content data is maintained, in operation 705, the electronic device may re-identify the battery voltage of the electronic device.

Figure 8B:
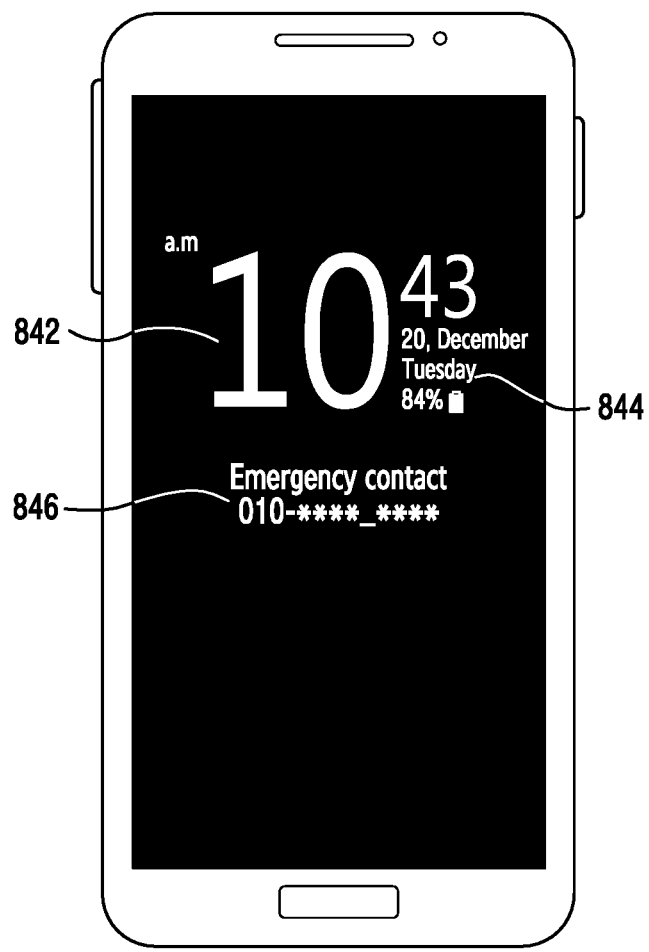

According to one exemplary embodiment, if the second content 824 is selected based on the user input, as shown in FIG. 8B, the electronic device (e.g., the display control module 262) may output the second content 824 to the display panel 264. For example, if the second content 824 of FIG. 8A is selected, the display control module 262 may store data and driving information corresponding to the second content 824. The driver module 268 may output the second content to the display panel 264 as shown in FIG. 8B based on the content data stored in the memory 266. For example, the display panel 264 may display the second content 824 including a digital clock 842 indicating the current time, the date 844, and an emergency contact 846.

Figure 8C:
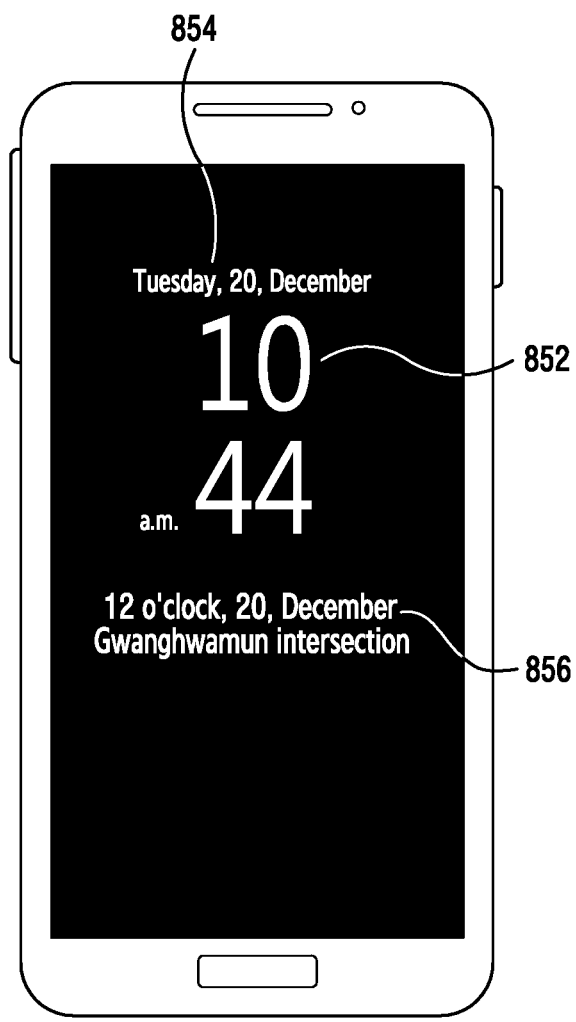

According to one exemplary embodiment, if the third content 826 is selected based on the user input, as shown in FIG. 8C, the electronic device (e.g., the display control module 262) may output the third content 826 to the display panel 264. For example, as shown in FIG. 8C, the driver module 268 may output the third content to the display panel 264 based on content data associated with the third content 826 stored in the memory 266. For example, the display panel 264 may display the third content 826 including the digital clock 852 indicating the current time, the date 864, and schedule information 856.

Figure 8D:
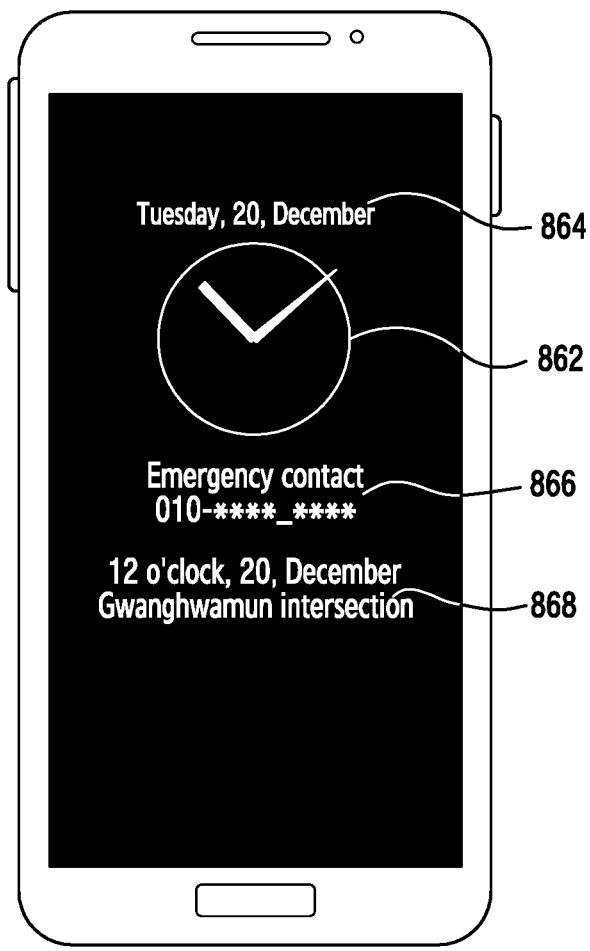

According to one exemplary embodiment, if the fifth content 830 is selected based on the user input, as shown in FIG. 8D, the electronic device (e.g., the display control module 262) may output the fifth content 830 to the display panel 264. For example, as shown in FIG. 8D, the driver module 268 may output the fifth content to the display panel 264 based on content data associated with the fifth content 830 stored in the memory 266. For example, the display panel 264 may display the fifth content 830 including the analog clock 862 indicating the current time, the date 864, an emergency contact 866, and schedule information 868.

According to various exemplary embodiments of the present disclosure, the electronic device (e.g., the processor 220) may determine the content usage time corresponding to a particular set of content to be displayed. The content usage time may be determined based on the size of content to be displayed. The processor 220 may determine that the usage time of content is relatively short in proportion to an increase in size of content to be displayed. For example, if the size of the third content 826 is greater than the size of the second content 824, the processor 220 may determine the usage time of the third content 826 to be shorter than the usage time of the second content 824.

Figure 9:
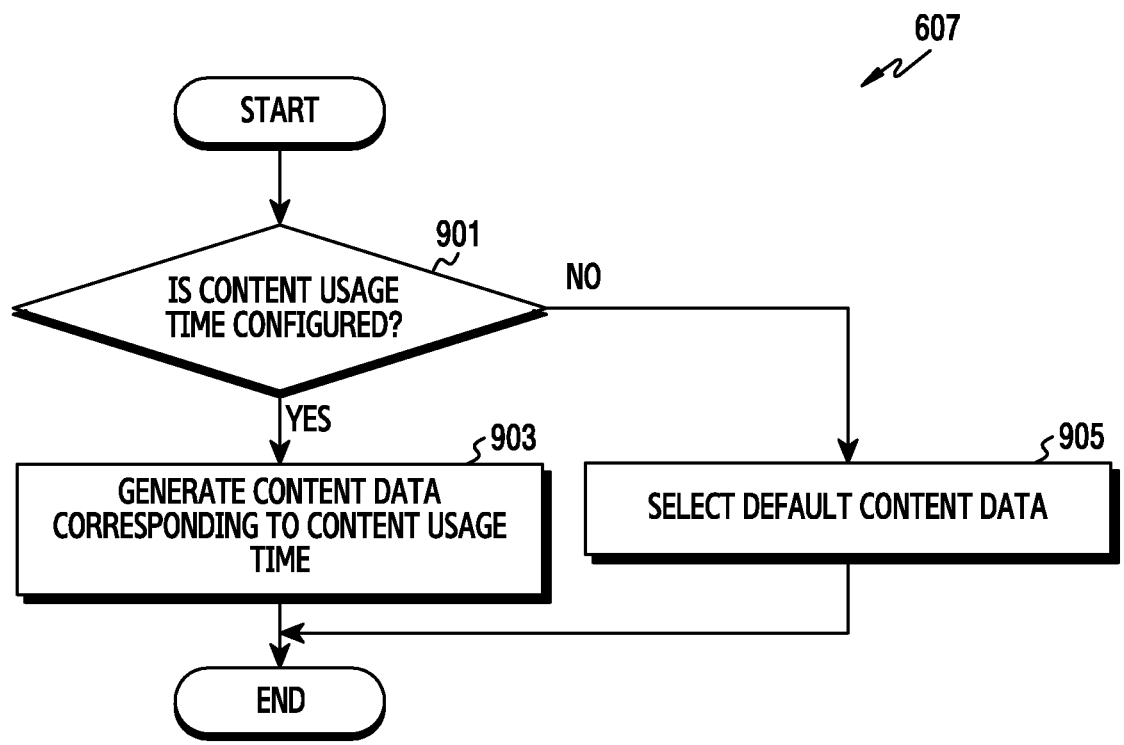
FIG. 9 is a flowchart illustrating a method for generating content data in an electronic device according to one exemplary embodiment of the present disclosure.
Figure 10:
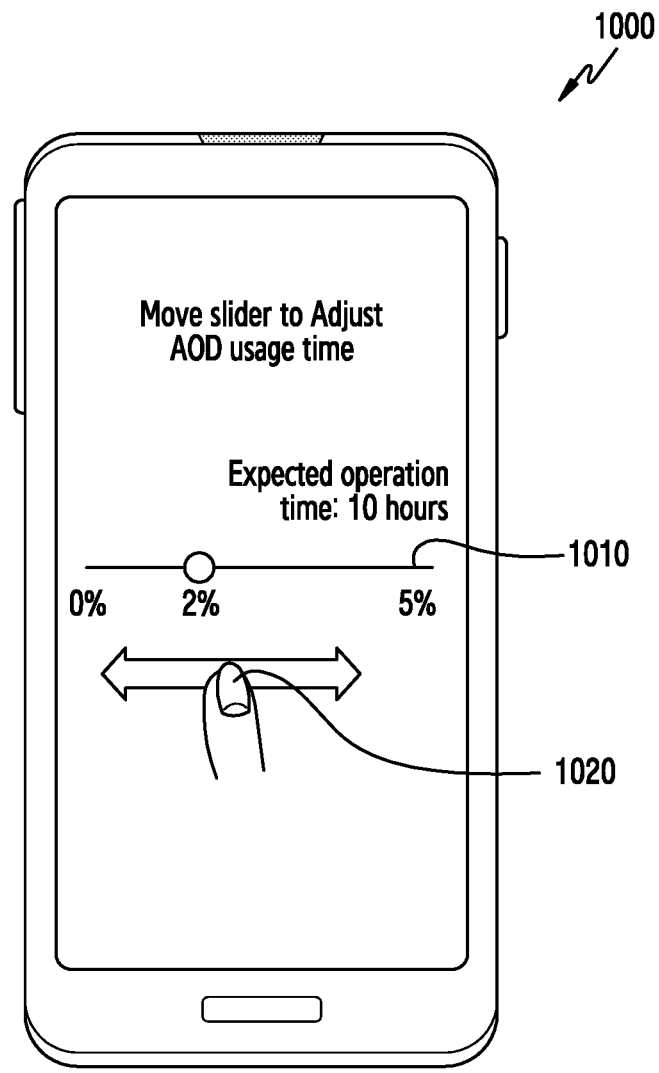
FIG. 10 is a view illustrating a configuration screen for setting a content usage time in an electronic device according to one exemplary embodiment of the present disclosure.

FIG. 9 is a flowchart illustrating a method for generating content data in an electronic device according to one exemplary embodiment of the present disclosure. FIG. 10 is a view illustrating a configuration screen for setting a content usage time in an electronic device according to one exemplary embodiment of the present disclosure. The following explanation is about the operation for generating content data in operation 607 of FIG. 6. In the following explanation, an electronic device may be the electronic device 201 of FIG. 2A or may include at least one part of the electronic device 201.

Referring to FIG. 9, in operation 901, if it is decided to generate (or transmit) content data to be displayed to a display module in a state where the driving of the processor is limited (e.g., operation 605 of FIG. 6), the electronic device (e.g., the processor 220) may determine whether a content usage time is configured by a user input. For example, upon detecting occurrence of a usage time configuration event, as shown in FIG. 10, the processor 220 may control the display module 260 to display a content usage time configuration screen 1000. For example, the content usage time configuration screen 1000 may include a time configuration bar 1010. The processor 220 may configure the usage time of content data based on the user input (e.g., a drag input) for the time configuration bar 1010.

In operation 903, if the content usage time is configured by the user input, the electronic device may generate content data corresponding to the content usage time. For example, the greater the size of content, the relatively greater the power consumed by the display panel 264 to display the content. If the first reference voltage level at which the driving of the processor 220 is terminated is fixed, the processor 220 may adjust the size of content to be output to the display panel 264 based on the content usage time. For example, if the content usage time is configured to be relatively long, the processor 220 may adjust the size of the displayed content to be relatively small.

In operation 905, if the content usage time is not configured by the user input, the electronic device may identify select default content, such as default-sized content, to be output via the display module in a state where the driving of the processor is terminated.

According to various exemplary embodiments of the present disclosure, the electronic device (e.g., the processor 220) may determine (or update) the first reference voltage level based on the content usage time. For example, the processor 220 may determine that the duration from the first reference voltage level 500 of FIG. 5 to the second reference voltage level 510. Accordingly, the processor 220 may increase the first reference voltage level 500 to increase the content usage time.

Figure 11:
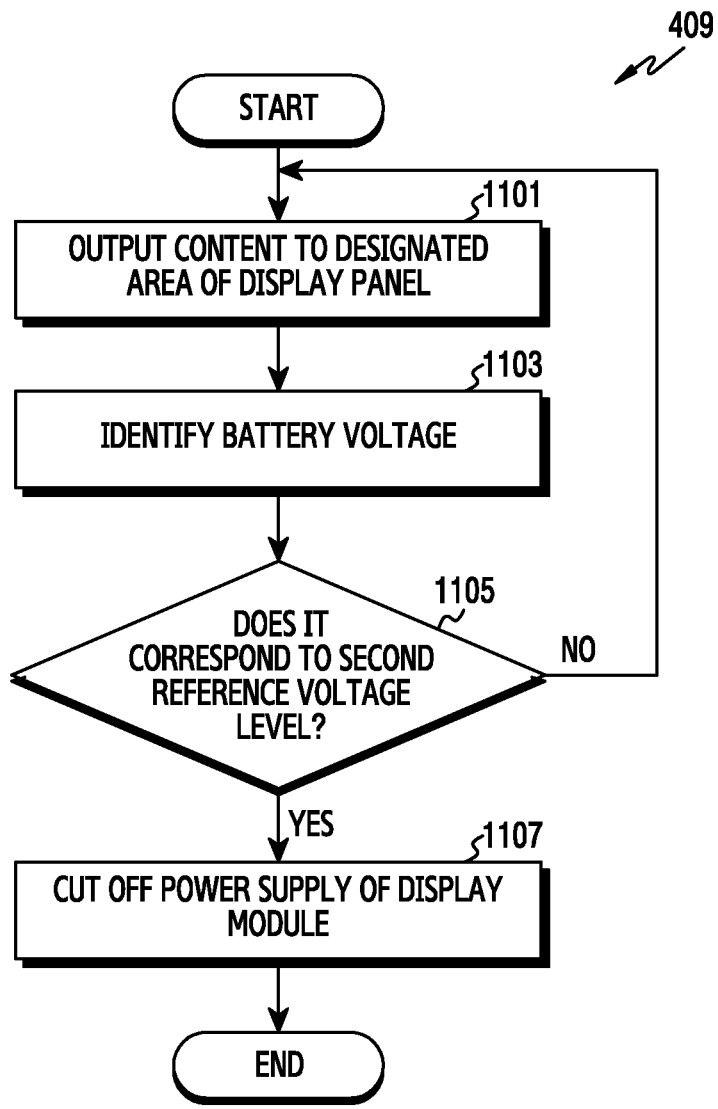
FIG. 11 is a flowchart illustrating a method for limiting driving of a display module in an electronic device according to one exemplary embodiment of the present disclosure.

FIG. 11 is a flowchart illustrating a method for limiting driving of a display module in an electronic device according to one exemplary embodiment of the present disclosure. The following explanation is about the operation for outputting content information in operation 409 of FIG. 4. In the following explanation, an electronic device may be the electronic device 201 of FIG. 2A or may include at least one part of the electronic device 201.

Referring to FIG. 11, in operation 1101, the electronic device (e.g., the display control module 262) may output content to a designated area of the display panel in a state where the driving of the processor is terminated. For example, the driver module 268 of the display control module 262 may select at least one part of content data stored in the memory 266 and may output it to the designated area of the display panel 264.

In operation 1103, the electronic device (e.g., the power module 280) may identify battery voltage. For example, if content is output to the display panel 264, a charger circuit of the electronic device may periodically identify the battery voltage.

In operation 1105, the electronic device (e.g., the power module 280 or the charger circuit) may determine whether the detected battery voltage corresponds to a second reference voltage level. For example, as shown in FIG. 5, the second reference voltage level 510 may include the minimum voltage level at which the display module 260 can be driven.

If the battery voltage corresponding to the second reference voltage level is not detected, in operation 1101, the electronic device (e.g., the display control module 262) may return to operation 1101 to persistently output content. For example, the display control module 262 may dynamically update an area for displaying content in the display panel 264 or a type of content displayed to the display panel 264 on the basis of driving information stored in the memory 266.

In operation 1107, upon detecting battery voltage corresponding to the second reference voltage level, the electronic device (e.g., the power module 280) may cut off power supply of the display module. For example, upon detecting the battery voltage corresponding to the second reference voltage level, the power module 280 may change the LDO (e.g., the LDO N 288 of FIG. 2C) corresponding to the display module 260 to cut off the power supply of the display module 260. For example, voltage of the battery 290, which corresponds to the second reference voltage level, may include voltage of the battery 290, which is less than or equal to the second reference voltage level, or voltage of the battery 290, which can reach the second reference voltage level.

Accordingly, the electronic device (e.g., the display control module 262) may output content to the display panel until the battery voltage reaches the second reference voltage level.

Figure 12:
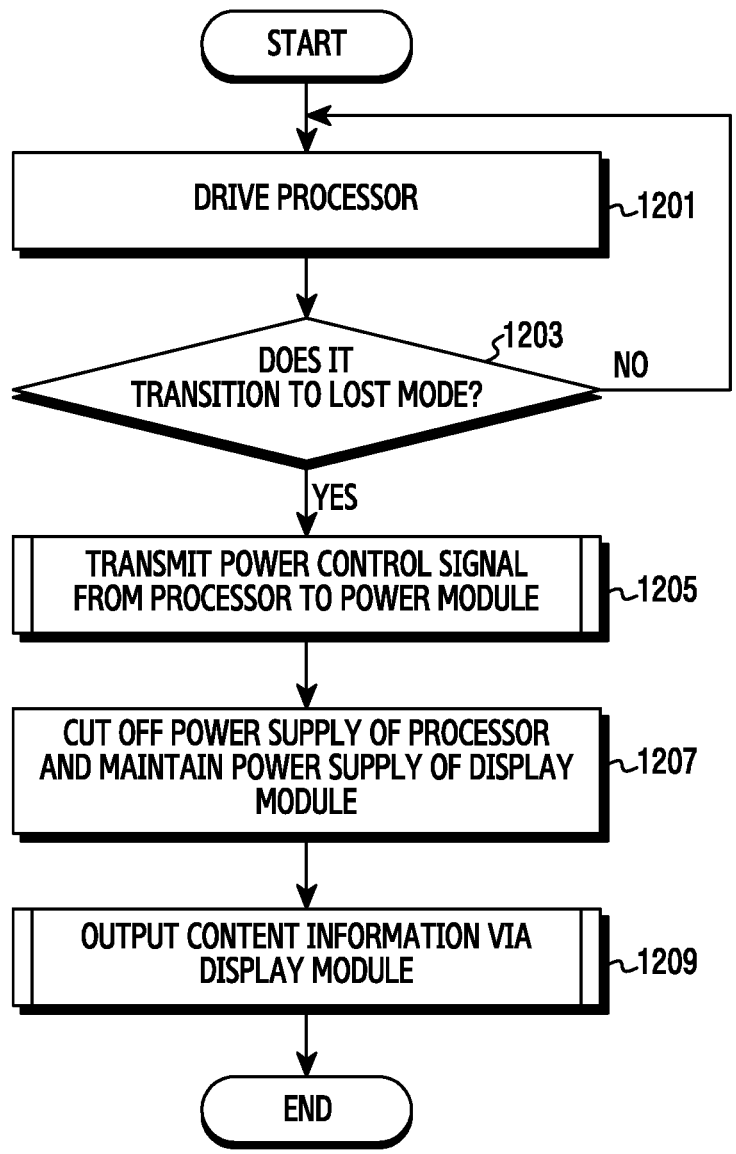
FIG. 12 is a flowchart illustrating a method for transitioning to a lost mode in an electronic device according to one exemplary embodiment of the present disclosure.
Figure 13:
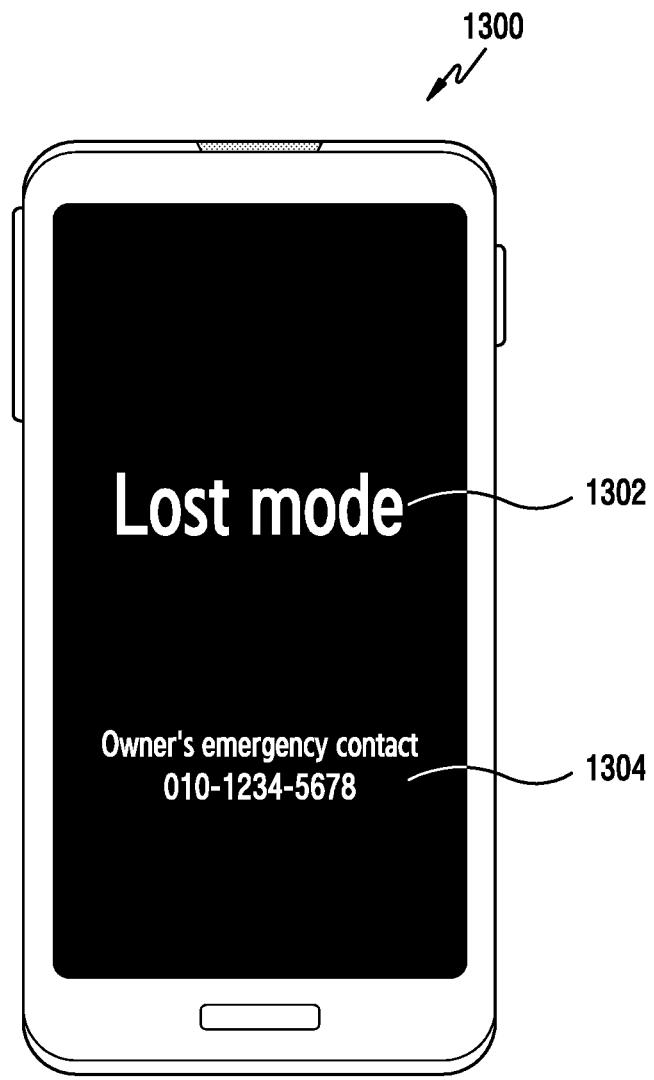
FIG. 13 illustrates a screen of a lost mode in an electronic device according to one exemplary embodiment of the present disclosure.

FIG. 12 is a flowchart illustrating a method for transitioning to a lost mode in an electronic device according to one exemplary embodiment of the present disclosure. FIG. 13 illustrates a screen of a lost mode in an electronic device according to one exemplary embodiment of the present disclosure. In the following explanation, an electronic device may be the electronic device 201 of FIG. 2A or may include at least one part of the electronic device 201.

Referring to FIG. 12, in operation 1201, the electronic device may drive the processor during the wake up mode.

In operation 1203, the electronic device (e.g., the processor 220) may determine whether an event for the lost mode transition is detected. For example, if lost mode information (e.g., a lost mode code) is included in a signal (e.g., text message, control signal, etc.) received via the communication interface 270, the processor 220 may determine that the event for the lost mode transition has occurred. In another example, if a communication connection between the electronic device 201 and another electronic device through near-distance communication is released, the processor 220 may determine that the event of the lost mode transition has occurred. For instance, if the distance between the electronic device 201 and another electronic device connected through the near-distance communication exceeds a reference distance such that the communication connection is released, the processor 220 may determine that the event for the lost mode transition has occurred.

If the event for the lost mode transition has not occurred, the electronic device returns to operation 1201.

In operation 1205, upon detecting the occurrence of the event for the lost mode transition, the electronic device (e.g., the processor 220) may transmit a power control signal to the power module. For example, if it is determined that the electronic device 201 is lost, the processor 220 may transmit to the power control module 280 a power control signal for maintaining power supply of the display module 260 and for cutting off power supply of the remaining internal circuits other than the display module 260. For example, after the processor 220 transmits the power control signal, the driving of the processor 220 may be terminated.

In operation 1207, the electronic device (e.g., the power module 280) may maintain power supply of the display module based on the power control signal. For example, upon receiving the power control signal from the processor 220, as shown in FIG. 2C, the power module 280 may maintain power supply for the display module 260 by maintaining a wake-up state of the LDO N 288 corresponding to the display module 260. The power module 280 may cut off power supply for the remaining internal components by deactivating LDOs corresponding to the remaining internal components.

In operation 1209, the electronic device (e.g., the display module 260) may output at least one part of content to at least one area of the display module in a state where the driving of the processor is terminated. For example, as shown in FIG. 13, the driver module 268 of the display control module 262 may output at least one part of content data stored in the memory 266 to the display panel 264 in the state where the driving of the processor 220 is terminated. For example, as shown in FIG. 13, the driver module 268 may output lost mode transition information 1302 and emergency contact information 1304 to the designated area of the display panel 264.

According to one exemplary embodiment, if the electronic device operates in the lost mode, the driving of the processor may be limited until the lost mode is released. For example, the display module 260 may output information related to the lost mode via the display panel 264 until the lost mode of the electronic device 201 is released.

According to various exemplary embodiments of the present disclosure, a method of operating an electronic device may include, if a designated condition is satisfied, transmitting a control signal for interrupting power supply to a processor of the electronic device to a power module, wherein the power module is configured to interrupt the power supply to at least one element of the electronic device based on the control signal, and transmitting content information to a display module of the electronic device so that the display module displays the content information when the power supply to the processor is interrupted.

According to various exemplary embodiments, the control signal may be transmitted upon detecting a battery voltage of the electronic device corresponding to a first reference voltage.

According to various exemplary embodiments, after transmitting the control signal, the method may further include maintaining the power supply to the display module, and interrupting the power supply to remaining elements of the electronic device.

According to various exemplary embodiments, the method may further include, upon detecting a battery voltage of the electronic device corresponding to a second reference voltage, interrupting the power supply to the display module.

According to various exemplary embodiments, the method may further include displaying at least one part of the content information in at least one area of the display module when the power supply to the processor is interrupted.

According to various exemplary embodiments, an electronic device and an operating method thereof can persistently display information in a power saving state in which driving of a processor is limited since content data is displayed by maintaining power supply to a display control module via a power module in a state where driving of the processor (e.g., AP) is limited (e.g., power off).

The term "module" as used herein may, for example, mean a unit including one of hardware, software, and firmware or a combination of two or more of them. The "module" may be interchangeably used with, for example, the term "unit," "logic," "logical block," "component," or "circuit." The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device comprising:
a display module;
a power module configured to interrupt power supply to at least one element of the electronic device based on a control signal; and
a processor configured to:
if a battery voltage of the electronic device corresponds to a first reference voltage, transmit to the power module the control signal for interrupting the power supply to the processor, and
maintain power supply to the display module and transmit content information to the display module so that the display module displays the content information when the power supply to the processor is interrupted.

2. The electronic device of claim 1, wherein, based on the control signal, the power module is configured to maintain the power supply to the display module and interrupt the power supply to remaining elements of the electronic device.

3. The electronic device of claim 2, wherein the power module is configured to identify the battery voltage of the electronic device, and if the identified battery voltage corresponds to a second reference voltage, interrupt the power supply to the display module.

4. The electronic device of claim 1, wherein the display module comprises a display control module and a display panel, and the display control module comprises a driving circuit and a memory.

5. The electronic device of claim 4, wherein the content information is stored in the memory, and the display control module is configured to control the display panel to display at least one part of the content information stored in the memory in at least one area of the display panel when the power supply to the processor is interrupted.

6. A method of operating an electronic device, the method comprising:
if a battery voltage of the electronic device corresponds to a first reference voltage, transmitting a control signal for interrupting power supply to a processor of the electronic device to a power module, wherein the power module is configured to interrupt the power supply to at least one element of the electronic device based on the control signal; and maintaining power supply to a display module of the electronic device and transmitting content information to the display module of the electronic device so that the display module displays the content information when the power supply to the processor is interrupted.

7. The method of claim 6, wherein after transmitting the control signal, the method further comprises:

maintaining the power supply to the display module; and interrupting the power supply to remaining elements of the electronic device.

8. The method of claim 7, further comprising, upon detecting the battery voltage of the electronic device corresponding to a second reference voltage, interrupting the power supply to the display module.

9. The method of claim 6, further comprising displaying at least one part of the content information in at least one area of the display module when the power supply to the processor is interrupted.

10. An electronic device comprising:
a display module;
a processor; and
a power module for controlling power supply of the electronic device,
wherein upon detecting a battery voltage of the electronic device corresponding to a first reference voltage, the processor is configured to transmit a power control signal to the power module,
wherein the power module is configured to cut off the power supply to the processor while maintaining the power supply to the display module based on the power control signal received from the processor, and
wherein the display module is configured to output at least one part of content to at least one area of the display module when the power supply to the processor is cut off.

11. The electronic device of claim 10, wherein the processor is configured to update the first reference voltage based on a maximum amount of time for which the display module is capable of displaying the content.

12. The electronic device of claim 10, wherein, prior to the power supply to the processor is cut off, the processor is configured to generate the content and transmit the content to the display module upon detecting the battery voltage of the electronic device corresponding to the first reference voltage.

13. The electronic device of claim 12, wherein the processor is further configured to generate the content based on a maximum amount of time for which the display module is capable of displaying the content.

14. The electronic device of claim 10, wherein, based on the power control signal, the power module is configured to maintain the power supply to the display module and cut off the power supply to at least one remaining element of the electronic device.

15. The electronic device of claim 10, wherein the power module is configured to cut off the power supply to the display module upon detecting the battery voltage of the electronic device corresponding to a second reference voltage.

16. The electronic device of claim 10, wherein the display module comprises a display control module and a display panel, and the display control module comprises a driving circuit and a memory.

17. The electronic device of claim 16, wherein the content is stored in the memory, and the display control module is configured to control the display panel to display at least one part of the content stored in the memory in at least one area of the display panel when the power supply to the processor is cut off.

* * * * *